(12) United States Patent
Geng et al.

(10) Patent No.: US 8,375,276 B2
(45) Date of Patent: Feb. 12, 2013

(54) METHOD AND APPARATUS FOR ENCODING AND DECODING DATA

(75) Inventors: Dongyu Geng, Shenzhen (CN); Raymond W. K. Leung, Shenzhen (CN); Dongning Feng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 343 days.

(21) Appl. No.: 12/778,594

(22) Filed: May 12, 2010

(65) Prior Publication Data

US 2010/0223535 A1    Sep. 2, 2010

Related U.S. Application Data

(63) Continuation of application No. PCT/CN2008/072975, filed on Nov. 7, 2008.

(30) Foreign Application Priority Data

Nov. 12, 2007    (CN) .......................... 2007 1 0186703

(51) Int. Cl.
*H03M 13/00* (2006.01)

(52) U.S. Cl. .................... 714/775; 714/752; 714/773

(58) Field of Classification Search ............. 714/775, 714/752, 704, 773, 763
See application file for complete search history.

(56) References Cited

U.S. PATENT DOCUMENTS

| | | | |
|---|---|---|---|
| 5,574,717 A * | 11/1996 | Tomizawa et al. | 370/244 |
| 6,892,336 B1 * | 5/2005 | Giorgetta et al. | 714/704 |
| 7,055,073 B2 | 5/2006 | Walker et al. | |
| 7,284,182 B2 | 10/2007 | Raashami | |
| 7,676,733 B2 | 3/2010 | Ganga et al. | |
| 2003/0046634 A1 | 3/2003 | Kikuchi et al. | |
| 2003/0131301 A1 | 7/2003 | Shimono et al. | |
| 2005/0028066 A1 | 2/2005 | Raahemi | |
| 2005/0249300 A1 | 11/2005 | Jeong et al. | |
| 2006/0098686 A1 | 5/2006 | Takakuwa et al. | |
| 2007/0103344 A1 | 5/2007 | Baumer | |
| 2007/0157060 A1 | 7/2007 | Ganga et al. | |

FOREIGN PATENT DOCUMENTS

| | | |
|---|---|---|
| CN | 1744484 A | 3/2006 |
| CN | 1754221 A | 3/2006 |
| CN | 1823526 A | 8/2006 |
| CN | 1964354 A | 5/2007 |
| CN | 101035295 A | 9/2007 |
| CN | 101267210 A | 9/2008 |
| EP | 2101415 A1 | 9/2009 |
| KR | 2001-0010456 | 2/2001 |

(Continued)

OTHER PUBLICATIONS

International Search Report issued in corresponding PCT Application No. PCT/CN2008/072975; mailed Feb. 5, 2009.

(Continued)

*Primary Examiner* — Fritz Alphonse
(74) *Attorney, Agent, or Firm* — Brinks Hofer Gilson & Lione

(57) ABSTRACT

The embodiments of the present invention provide a data coding method. In this data coding method, a synchronization header is added to the data that has undergone line coding and FEC coding, and then the data is framed and sent out. The embodiments of the present invention also provide the corresponding data decoding method, data coding apparatus, and data decoding apparatus. Because the redundant information for synchronization is added, the synchronization performance of the transmission system is ensured effectively even if the algorithm selected in the line coding provides low redundancy; moreover, the added synchronization header does not participate in the FEC coding calculation, thus preventing impact on the FEC coding gain.

18 Claims, 18 Drawing Sheets

FOREIGN PATENT DOCUMENTS

WO  WO 2002/080479 A1  10/2002

OTHER PUBLICATIONS

Written Opinion of the International Searching Authority issued in corresponding International Patent Application No. PCT/CN2008/072975, mailed Feb. 5, 2009.

Extended European Search Report issued in corresponding European Patent Application No. 08855285.6, mailed Nov. 30, 2010.

First Office Action issued in Chinese Patent Application No. 200710186703.8, mailed Dec. 3, 2010.

European Standard Telecommunications Series, "Radio broadcasting systems; DAta Radio Channel (DARC); System for Wireless Infotainment Forwarding and Teledistribution", European Broadcasting Union. ETSI EN 300 751, V1.2.1, Jan. 2003.

IEEE Computer Society, "Part 3: Carrier Sense Multiple Access with Collision Detection (CSMA/CD) Access Method and Physical Layer Specifications—Amendment 1: Physical Layer and Management Parameters for 10 Gb/s Operation, Type 10GBASE-T". IEEE Std 802.3an, Sep. 2006.

IEEE Computer Society, "Part 3: Carrier Sense Multiple Access with Collision Detection (CSMA/CD) Access Method and Physical Layer Specifications—Amendment: Media Access Control Parameters, Physical Layers, and Management Parameters for Subscriber Access Networks". IEEE Std 802.3ah, Sep. 2004.

IEEE Computer Society, "Part 3: Carrier Sense Multiple Access with Collision Detection (CSMA/CD) Access Method and Physical Layer Specifications—Amendment: Media Access Control (MAC) Parameters, Physical Layers, and Management Parameters for 10 Gb/s Operation". IEEE Std 802.3ae, Aug. 2002.

Office Action issued in corresponding European Patent Application No. 08855285.6, mailed May 11, 2012.

Office Action issued in corresponding European Patent Application No. 08855285.6, mailed Jul. 12, 2011.

Effenberger et al., "Considerations on FEC and Line code", IEEE P802.3AV 10GEPON Task Force, IEEE 802.3 Interim Meeting, Geneva, Switzerland, May 28-30, 2007.

* cited by examiner

METHOD AND APPARATUS FOR ENCODING AND DECODING DATA

CROSS-REFERENCE TO RELATED APPLICATIONS

This application is a continuation of International Application No. PCT/CN2008/072975, filed on Nov. 7, 2008, which claims priority to Chinese Patent Application No. 200710186703.8, filed on Nov. 12, 2007, both of which are hereby incorporated by reference in their entireties.

FIELD OF THE INVENTION

The present invention relates to communication technologies, and in particular, to communication technologies of encoding and decoding based on Forward Error Correction (FEC).

BACKGROUND

With the development of communication technologies, users impose higher and higher requirements on the Quality of Service (QoS) such as capacity and speed of communication. The access network is one of the most technically challenging areas in the whole telecom network. In order to meet users' increasing requirements on the bandwidth and realize high speed, broadband, and intelligence of the access network, access technologies are emerging, such as Local Area Network (LAN), Digital Subscriber Line (DSL), Hybrid Fiber Coax (HFC) cable network, HFC-Cable modem, and Power Line Communication (PLC). However, the optical access technology is regarded as the most promising access technology. Passive Optical Network (PON) is an optical access trendsetter due to its easy maintainability, high bandwidth, and low costs, and is an ideal physical platform for accessing multiple services such as voice, data, and video services through a single platform.

The PON technology is a point-to-multipoint fiber access technology. A PON is composed of Optical Line Terminal (OLT), Optical Network Unit (ONU), and Optical Distribution Network (ODN). The Ethernet Passive Optical Network (EPON) technology is a good access technology. The EPON is characterized by easy maintenance, cost efficiency, high transmission bandwidth, and a high performance-to-price ratio. Especially, the EPON technology provides 1-10 GHz bandwidth, which enables simultaneous transmission of voice, data, and video services.

The EPON is a technology based on passive optical transmission, and involves no component of the amplification or relay function. Therefore, the transmission distance and the number of branches of the EPON depend on power budget and various transmission losses. With the increase of the transmission distance or the number of branches, the Signal to Noise Ratio (SNR) of the transmitted data diminishes, and more bit errors occur. In order to solve the problem, an FEC technology is introduced into the EPON system to improve the anti-interference capability of the system and increase the power budget of the system.

FEC refers to processing the signal in a specific mode before the signal is transmitted, and decoding the signal at the receiver end according to the corresponding algorithm to find and correct the erroneous codes. The basic working principles of the FEC in the EPON system are: An FEC check codeword is added after the Ethernet frame transmitted at the transmitter. The check codeword is correlated with the checked Ethernet frame data based on a determined rule. The receiver checks the relation between the Ethernet frame data and the check codeword according to the established rule. Once the transmission is erroneous, the relation is damaged, and the erroneous code is found and corrected automatically. The FEC technology strives to use the least check bytes to correct the most errors, and find the best tradeoff between the overhead (increased check bytes) and the obtained coding gain.

FIG. 1 shows a mapping relation between the Open System Interconnection (OSI) reference model and the IEEE802.3 LAN model. The model is applicable to the Ethernet defined by the 802.3-2005 standard. Currently, the 1 G and 10 G EPON systems employ such a model. Not only the FEC technology but also a line coding technology is introduced into the physical layer of the EPON system.

Line coding mechanisms are of two types: value mapping mechanism and scrambler mechanism. In the existing EPON system, the 8 B/10 B (B: Bit) line coding mechanism is applied, which is a value mapping mechanism. A significant drawback of the 8 B/10 B coding scheme is that the coding redundancy is up to 25%, and the coding overhead is great. In order to save the coding overhead, a series of standards such as 10 GBASE-W and 10 GBASE-R use the 64 B/66 B line coding on the Physical Coding Sublayer (PCS). In the 10 GBASE-T standard, the 64 B/65 B line coding is applied on the PCS. In the 10 GEPON system currently under development by the IEEE802.3av workgroup, the line coding mechanisms such as 64 B/66 B and 64 B/65 B of higher coding efficiency are introduced. The two line coding mechanisms use the scrambling mode that carries non-scrambled synchronization characters and control characters.

The 64 B/66 B coding mechanism adds a 2-bit synchronization character (synchronization header) on the basis of the 64-bit information. The 2-bit synchronization character is arranged in either of the two modes: "01", or "10". The synchronization character "01" means that all the 64 bits are data information; the synchronization character "10" means that the 64 bits include data information and control information. The synchronization character "00" or "11" means that errors occur in the transmission process. Meanwhile, the use of the synchronization character ensures that the transmitted data has at least one "0" and "1" transition at intervals of 66 bits, which facilitates the implementation of Block Synchronization (BS). The 64-bit information is scrambled through an auto sync scrambling mechanism, thus maximally ensuring enough changeover of all transmitted information and facilitating clock recovery at the receiver end. Compared with the 64 B/66 B coding mechanism, the 64 B/65 B coding uses a 1-bit data/control character. The data/control character "0" means that all the 64 bits are data information; the data/control character "1" means that the 64 bits include data information and control information.

Currently, a design scheme pertinent to the PCS in a 10 G EPON system is shown in FIG. 2 and FIG. 3. FIG. 2 is a transmitting flowchart on the physical layer of this system; and FIG. 3 is a receiving flowchart on the physical layer of this system.

In FIG. 2, the Ethernet data frame is processed by a reconciliation sublayer and a 10 Gigabit Media Independent Interface (XGMII) first, and then undergoes the 64 B/66 B line coding. The coding process is to add a 2-bit synchronization character to the 64-bit Ethernet data information so that the data changes from 64 bits to 66 bits. Generally, the encoded 66-bit codeword is called a block. Subsequently, the data and the control information in the block are scrambled, and then the data in the frame undergoes FEC coding. The encoded data passes through the Physical Medium Attachment (PMA) sublayer and the Physical Medium Dependent (PMD) sublayer, and is then sent out. The receiving process on the physical layer is an inverse of the sending process, as shown in FIG. 3.

In the process of research and practice, the inventor finds that the line coding and the FEC coding bring benefits at the cost of increasing redundant information. In the prior art, the data that has undergone the line coding and the FEC coding is framed and sent directly; if the algorithm selected in the line coding involves high redundancy, then a large amount of redundant information is encoded as the data part of the FEC coding, this affects the performance of the FEC coding; if the algorithm selected in the line coding involves low redundancy, the FEC performance is improved but the synchronization performance of the transmission system is affected. It is hard to accomplish a tradeoff between them.

SUMMARY

The embodiments of the present invention provide a method and an apparatus for encoding and decoding data to ensure the synchronization performance of the transmission system without affecting the improvement of the coding gain.

A data coding method includes:

performing line coding for input data to generate an information block which includes information data and a first synchronization header;

performing FEC coding for the information block to generate a check block; adding a second synchronization header to the information block; and generating a transmitting data frame which includes the information block with the added second synchronization header and the corresponding check block.

A data decoding method includes:

receiving a data frame which includes an initial information block and a corresponding check block, where the initial information block has a data synchronization header composed of a first synchronization header and a second synchronization header;

synchronizing the received data frame according to the data synchronization header, and extracting the initial information block and the check block;

removing the second synchronization header of the initial information block to obtain an information block that includes the first synchronization header and information data;

using the check block to perform FEC decoding for the first synchronization header and the information data of the information block; and performing line decoding for the information block after the FEC decoding.

A data coding apparatus includes:

a line coding unit, configured to: perform line coding for input data, and output a generated information block which includes information data and a first synchronization header;

an error correction coding unit, configured to: perform FEC coding for the information block, and output a generated check block;

a header adding unit, configured to add a second synchronization header to the information block; and a framing unit, configured to: generate a transmitting data frame which includes the information block with the added second synchronization header and the corresponding check block.

A data decoding apparatus includes:

a receiving unit, configured to: receive a data frame which includes an initial information block and a corresponding check block, where the initial information block has a data synchronization header composed of a first synchronization header and a second synchronization header; and synchronize the data frame according to the data synchronization header, and output the initial information block and the check block;

a header removing unit, configured to: remove the second synchronization header of the initial information block, and output an information block that includes the first synchronization header and information data;

an error correction decoding unit, configured to: use the check block to perform FEC decoding for the first synchronization header and the information data of the information block, and output the information block after the FEC decoding; and a line decoding unit, configured to: perform line decoding for the information block after the FEC decoding, and output recovered data.

In the method and the apparatus described above, a synchronization header is added on the data which has undergone line coding and FEC coding, and then the data is framed and sent out. Because the redundant information for synchronization is added, the synchronization performance of the transmission system is ensured effectively even if the algorithm selected in the line coding provides low redundancy; moreover, the added synchronization header does not participate in the FEC coding calculation, thus preventing impact on the FEC coding gain.

DETAILED DESCRIPTION OF THE EMBODIMENTS

The embodiments of the present invention provide a data coding method. In this data coding method, a synchronization header is added to the data that has undergone line coding and FEC coding, and then the data is framed and sent out. The embodiments of the present invention provide the corresponding data decoding method, data coding apparatus, and data decoding apparatus, which are elaborated below separately.

Figure 1:
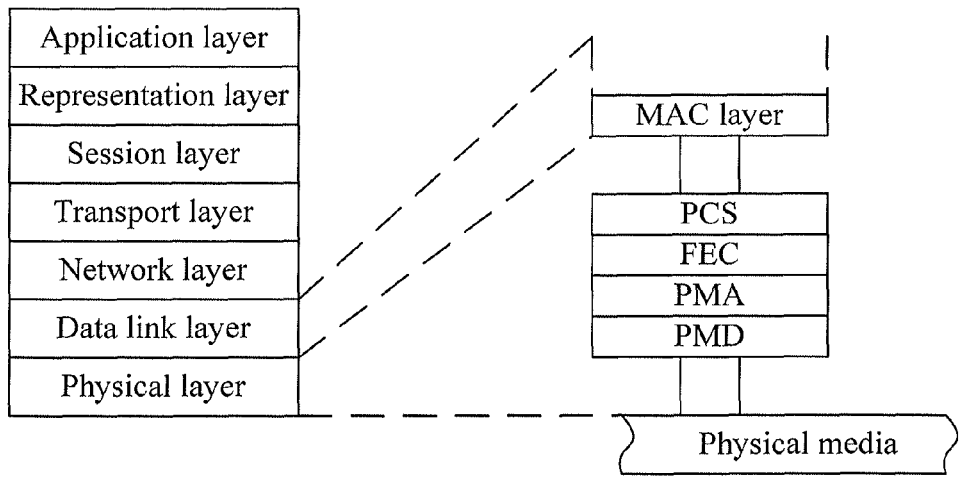
FIG. 1 shows a mapping relation between an OSI reference model and an IEEE802.3 LAN model.
Figure 2:
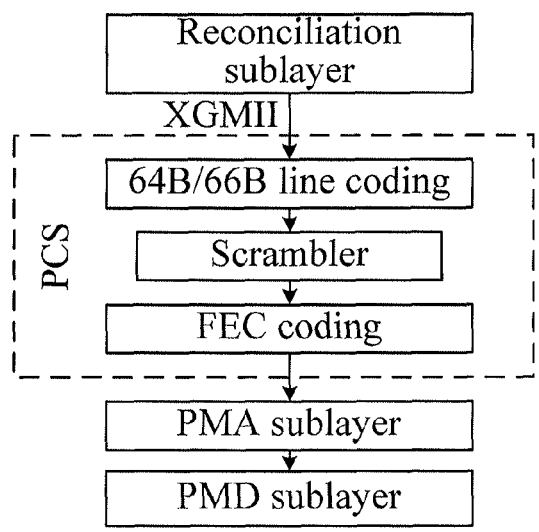
FIG. 2 is a data sending flowchart on a physical layer of a 10 G EPON system in the prior art.
Figure 3:
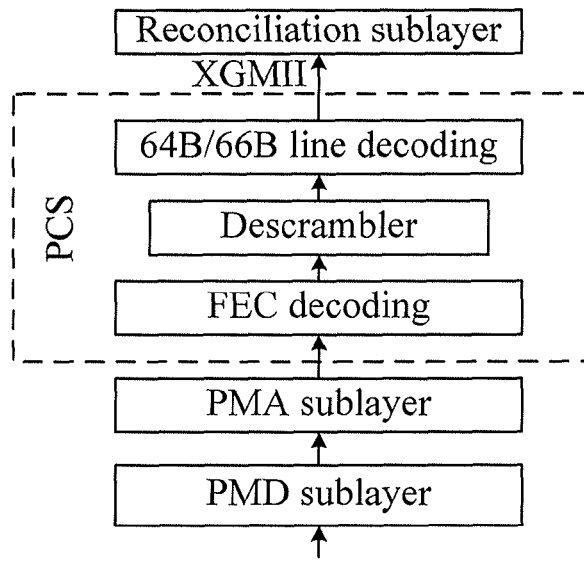
FIG. 3 is a data receiving flowchart on a physical layer of a 10 G EPON system in the prior art.
Figure 4:
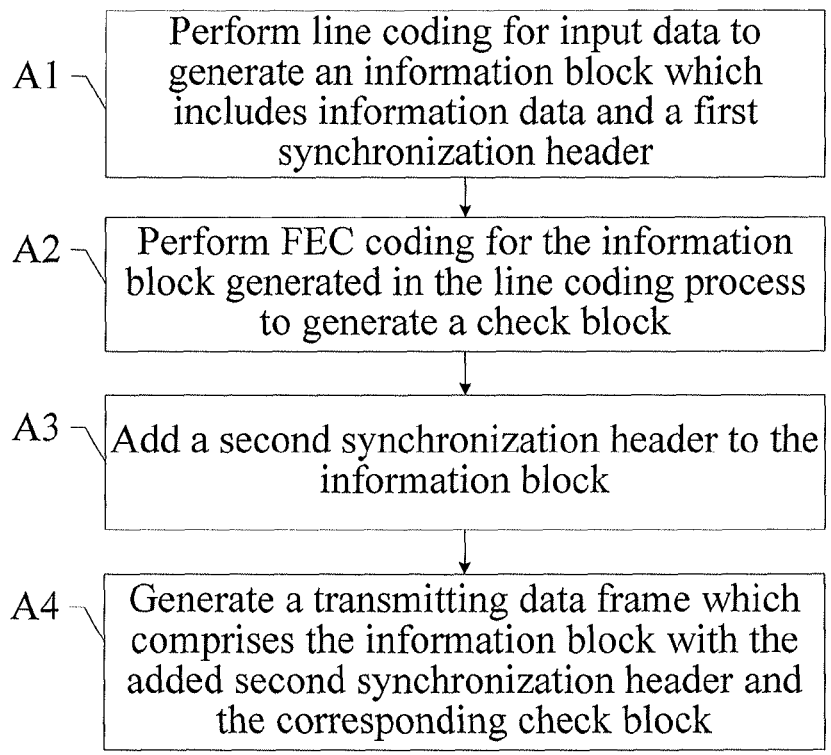
FIG. 4 shows main steps of a data coding method in an embodiment of the present invention.

As shown in FIG. 4, a data coding method provided in an embodiment of the present invention includes the following steps:

A1: Perform line coding for input data to generate an information block which includes information data and a first synchronization header.

The "input data" in this embodiment refers to the data content that needs to be transmitted. For example, for the 10 G EPON application, the input data may refer to the XGMII transmission frame sent by the reconciliation sublayer to the physical coding sublayer; for the general 802.3 Ethernet application, the input data may refer to the general Ethernet transmission frame, where the general Ethernet transmission may refer to the general Ethernet frame.

Because this embodiment ensures the synchronization performance of the transmission system effectively, an algorithm of low redundancy may be selected for line coding, for example, 64 B/65 B coding, or 32 B/33 B coding. In such types of line coding, only a 1-bit Data/Ctl_header is added to the information data for indicating the type of the transmitted data. In order to ensure enough transition of data in the transmission, the information data in the information block may be scrambled after the line coding. The scrambling mode and the line coding process are based on the prior art. In this embodiment, the block header generated in the line coding process is called the first synchronization header.

A2: Perform FEC coding for the information block generated in the line coding process to generate a check block.

This embodiment does not specify the algorithm applied in the FEC coding. Moreover, in order to better protect the important contents in the information block, the information block may be further processed before the FEC coding according to the characteristics of the FEC coding method applied. For example, the contents of several information blocks are arranged, and the important data (such as the first synchronization headers) are gathered together.

The FEC coding process generally calculates the input data according to a certain rule to obtain a check codeword shorter than the input data. The receiver calculates the relation between the received check codeword and the data part to determine whether the data part is transmitted correctly and correct the errors to some extent. A common FEC coding mode is to use RS (Reed-Solomon) codes, which are capable of correcting burst errors and random errors.

If the coding mode of the FEC coder is to process a fixed-length sequence k, several information blocks may be connected into an information sequence of a proper length, and input into the FEC coder. Nevertheless, the length of the information sequence may be less than the sequence length k required by the FEC coder. In this case, the information sequence may be filled to increase its length to k, and then input into the FEC coder for coding. In this embodiment, FEC (n, k) represents the length of the output/input sequence of the FEC coder, where n represents the length of the coded sequence and (n−k) represents the length of the check block sequence.

A3: Add a second synchronization header to the information block.

The information block in this step may be the information block ready for FEC coding, or the information block in the code sequence output by the FEC coder. If the information block in this step is the information block in the code sequence output by the FEC coder, the information block that has undergone the processing such as arrangement and filling before entering the FEC coder needs to be recovered in the corresponding mode after the coding.

The added second synchronization header may be obtained through simple calculation of the first synchronization header. While an extra synchronization header is added to the information block, a check synchronization header may be added to the check block to enhance the synchronization capability of the system.

A4: Generate a transmitting data frame which includes the information block with the added second synchronization header and the corresponding check block.

This embodiment does not specify the framing mode, the sending mode, or the transmission mode. Generally, the information and the corresponding check block are reassembled into an FEC frame, and sent as an FEC frame. If the rate of the PCS sublayer that sends the data frame is different from the rate of the lower PMA sublayer, the corresponding rate matching policy needs to be applied to process the data frame to be transmitted, and make the data frame receivable to the lower layer.

Figure 5:
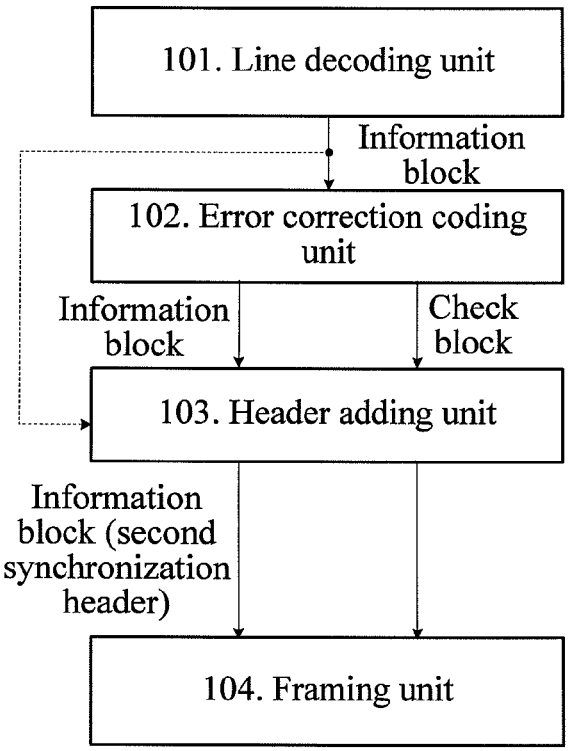
FIG. 5 shows a basic logical structure of a data coding apparatus in an embodiment of the present invention.

As shown in FIG. 5, the basic logical structure of the data coding apparatus corresponding to the data coding method in an embodiment of the present invention includes:

a line coding unit 101, configured to: perform line coding for input data, and output a generated information block which includes information data and a first synchronization header;

an error correction coding unit 102, configured to: perform FEC coding for the information block that has undergone the line coding, and output a generated check block, where the error correction coding unit 102 may further be configured to output the information block corresponding to the check block at the same time;

a header adding unit 103, configured to a dd a second synchronization header to the information block, where the operation object of the header adding unit may be the information block output by the error correction coding unit (indicated by the solid line in FIG. 5), or the information block output by the line coding unit (indicated by the dotted line in FIG. 5); and a framing unit 104, configured to send the information block with the added second synchronization header and the corresponding check block, where the framing unit 104 is specifically capable of framing and rate matching.

Based on the foregoing basic logical structure, the corresponding logical unit may be added according to the functional requirements, or the logical structure of the existing logical unit may be improved finely.

Figure 6:
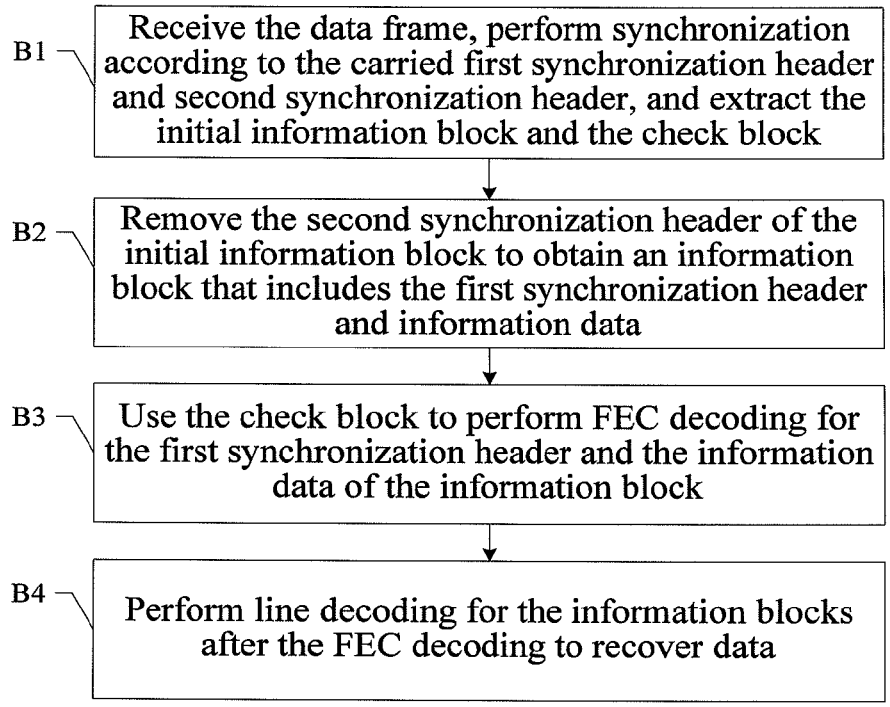
FIG. 6 shows main steps of a data decoding method in an embodiment of the present invention.

As shown in FIG. 6, the data decoding method corresponding to the data coding method in an embodiment of the present invention includes the following steps:

B1: Receive a data frame which includes an initial information block and a corresponding check block, where the initial information block has a data synchronization header composed of a first synchronization header and a second synchronization header, synchronize the data frame according to the data synchronization header, and extract the initial information block and the check block.

It can be seen from the coding process described above that, the data frame received by the receiver includes at least the first synchronization header generated in the line coding process and the second synchronization header added after the FEC coding. The two synchronization headers combine into a data synchronization header. The data frame may further include a check synchronization header. Such information is useful for performing frame synchronization for the received data, determining the beginning and the end of the frame, and obtaining a complete FEC frame to facilitate subsequent decoding.

B2: Remove the second synchronization header of the initial information block to obtain an information block that includes the first synchronization header and information data.

The second synchronization header is designed for frame synchronization, and may be removed after completion of the frame synchronization. If a check synchronization header is added to the check block in the code sending process, the check synchronization header needs to be removed together.

B3: Use the check block to perform FEC decoding for the first synchronization header and the information data of the information block.

The FEC decoding process is an inverse of the FEC coding process. If the information sequence are arranged and filled in the FEC coding process, the information sequence for the FEC decoding needs to undergo similar operations before the FEC decoding to ensure correct progress of the FEC decoding, and the FEC decoding result needs to undergo the operations such as rearrangement and deletion to recover the information block.

B4: Perform line decoding for the information block after the FEC decoding.

The line decoding process is an inverse of the line coding process. If the information data is scrambled after the line coding, the information data needs to be descrambled before the line decoding.

Figure 7:
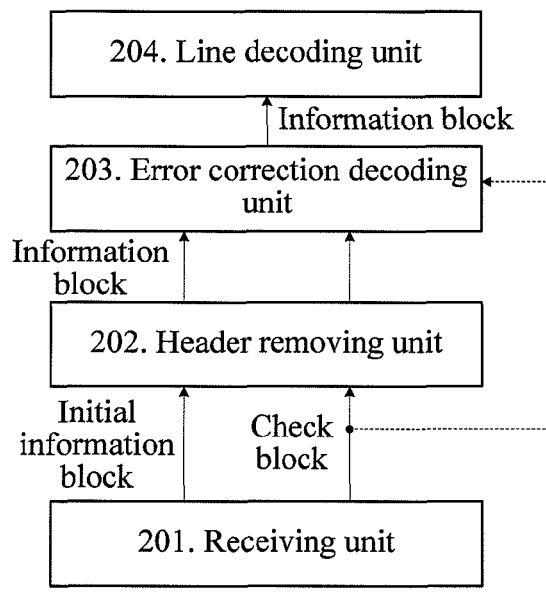
FIG. 7 shows a basic logical structure of a data decoding apparatus in an embodiment of the present invention.

As shown in FIG. 7, the basic logical structure of the data decoding apparatus corresponding to the data decoding method in an embodiment of the present invention includes:

a receiving unit 201, configured to: receive a data frame which includes an initial information block and a corresponding check block, where the initial information block has a data synchronization header composed of a first synchronization header and a second synchronization header; synchronize the data frame according to the data synchronization header; and output the initial information block and the check block;

a header removing unit 202, configured to: remove the second synchronization header of the initial information block, and output an information block that includes the first synchronization header and information data, where: if the check block output by the receiving unit includes a check synchronization header, the header removing unit 202 needs to remove the check synchronization header of the check block together, and output the check block free of the check synchronization header, as indicated by the solid line in FIG. 7; if the check block output by the receiving unit includes no check synchronization header, the check block may be output to the error correction decoding unit directly, as indicated by the dotted line in FIG. 7;

an error correction decoding unit 203, configured to: use the check block to perform FEC decoding for the first synchronization header and the information data of the information block, and output the information block after the FEC decoding; and a line decoding unit 204, configured to: perform line decoding for the information block after the FEC decoding, and output recovered data.

Based on the logical structure used at the coder, the corresponding logical unit may be added in the basic logical structure of the decoder, or the logical structure of the existing logical unit may be improved finely.

The foregoing technical solution and basic structure are detailed below based on embodiments.

Embodiment 1

Figure 8:
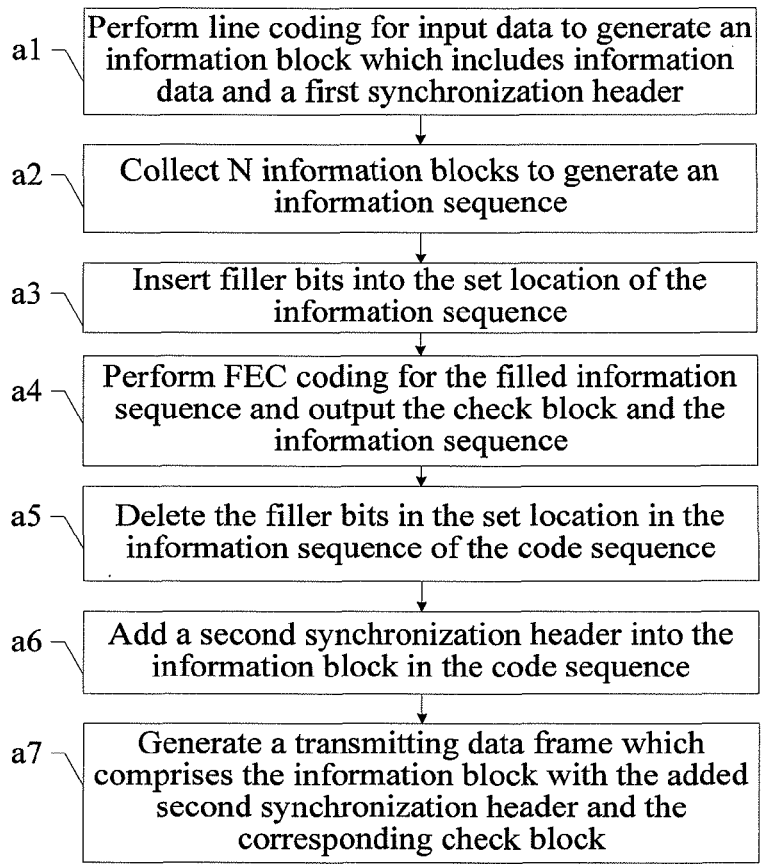
FIG. 8 is a flowchart of a data coding method in the first embodiment of the present invention.

As shown in FIG. 8, a data coding method includes the following steps:

a1: Perform line coding for the input data whose length is $L1-1$ to generate an information block. The length of the information block is $L1$, and the information block includes information data and a 1-bit first synchronization header. That is, the line coding in use is $(L1-1)B/(L1)B$ coding.

a2: Collect N information blocks to generate an information sequence.

a3: If the coder is an FEC (n, k) coder and $N*L1<k$, insert $k-N*L1$ filler bits into the set location of the information sequence. Generally, the filler bits may be inserted at the head or end of the information sequence. For ease of calculation, the filler bits may be all 0s or all 1s.

a4: Perform FEC coding for the filled information sequence to generate M check blocks, and output the filled information sequence for coding.

a5: Delete the $k-N*L1$ filler bits in the set location in the information sequence of the code sequence.

a6: Add a 1-bit second synchronization header into the information block in the code sequence.

The second synchronization header added into the information block may be obtained in this way: perform the set operation for the first synchronization header of the information block to obtain the second synchronization header of the information block. Generally, the operation method may be negation by bit, namely, if the first synchronization header is "1", the added second synchronization header is "0", and vice versa.

a7: Send the information block with the added second synchronization header and the corresponding check block.

In this embodiment, it is assumed that the information block in the FEC coding result is the object to which the synchronization header is added. Therefore, it is not necessary to buffer the information sequence obtained in step a2, and no buffer is required. Alternatively, the information sequence obtained in step a2 may be applied so that the deletion operation in step a5 is not required and the processing is simplified. In practice, the operation may be selected as required.

Embodiment 2

Figure 9:
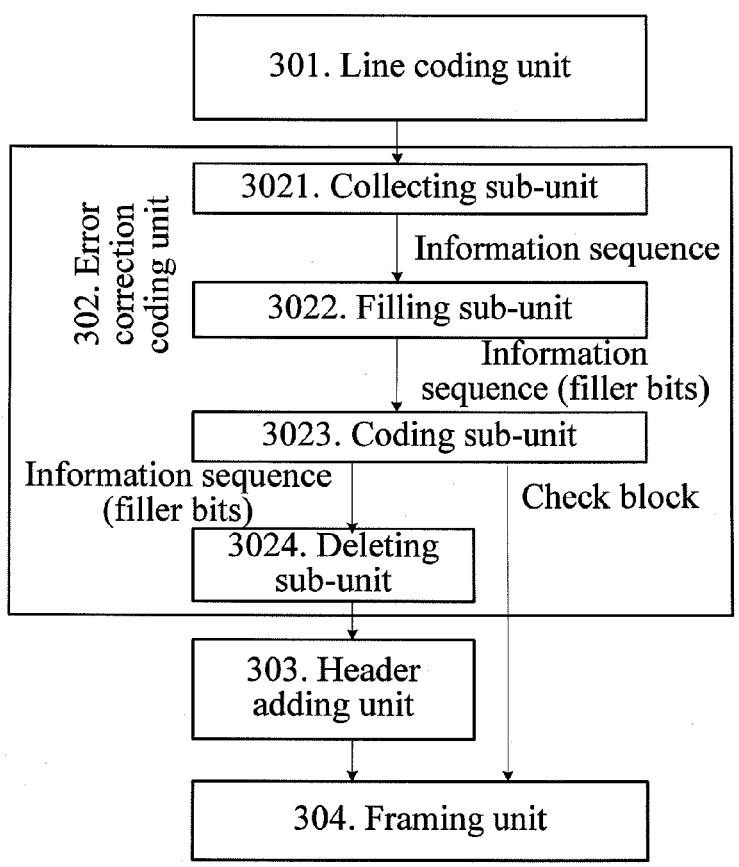
FIG. 9 shows a logical structure of a data coding apparatus in the second embodiment of the present invention.

A data coding apparatus is provided to perform the data coding method in the first embodiment. As shown in FIG. 9, the logical structure of the data coding apparatus includes: a line coding unit 301, an error correction coding unit 302, a header adding unit 303, and a framing unit 304.

The line coding unit 301 is configured to perform line coding for the input data whose length is L1−1, and output a generated information block. The length of the information block is L1, and the information block includes information data and a 1-bit first synchronization header.

The error correction coding unit 302 includes a collecting sub-unit 3021, a filling sub-unit 3022, a coding sub-unit 3023, and a deleting sub-unit 3024, as detailed below.

The collecting sub-unit 3021 is configured to collect N information blocks and output the generated information blocks. The length of the output information sequence is N*L1<k, where k is the length of the sequence required for FEC coding.

The filling sub-unit 3022 is configured to insert k−N*L1 filler bits into the set location of the information sequence output by the collecting sub-unit 3021, and output the filled information sequence to the coding sub-unit 3023.

The coding sub-unit 3023 is configured to perform FEC (n, k) coding for the input information sequence, and output the generated M check blocks and the filled information sequence for coding.

The deleting sub-unit 3024 is configured to delete the filler bit in the information sequence output by the coding sub-unit 3023.

The header adding unit 303 is configured to add a 1-bit second synchronization header into the information block in the information sequence output by the error correction coding unit 302.

The framing unit 304 is configured to send the information block with the added second synchronization header and the corresponding check block.

Embodiment 3

Figure 10:
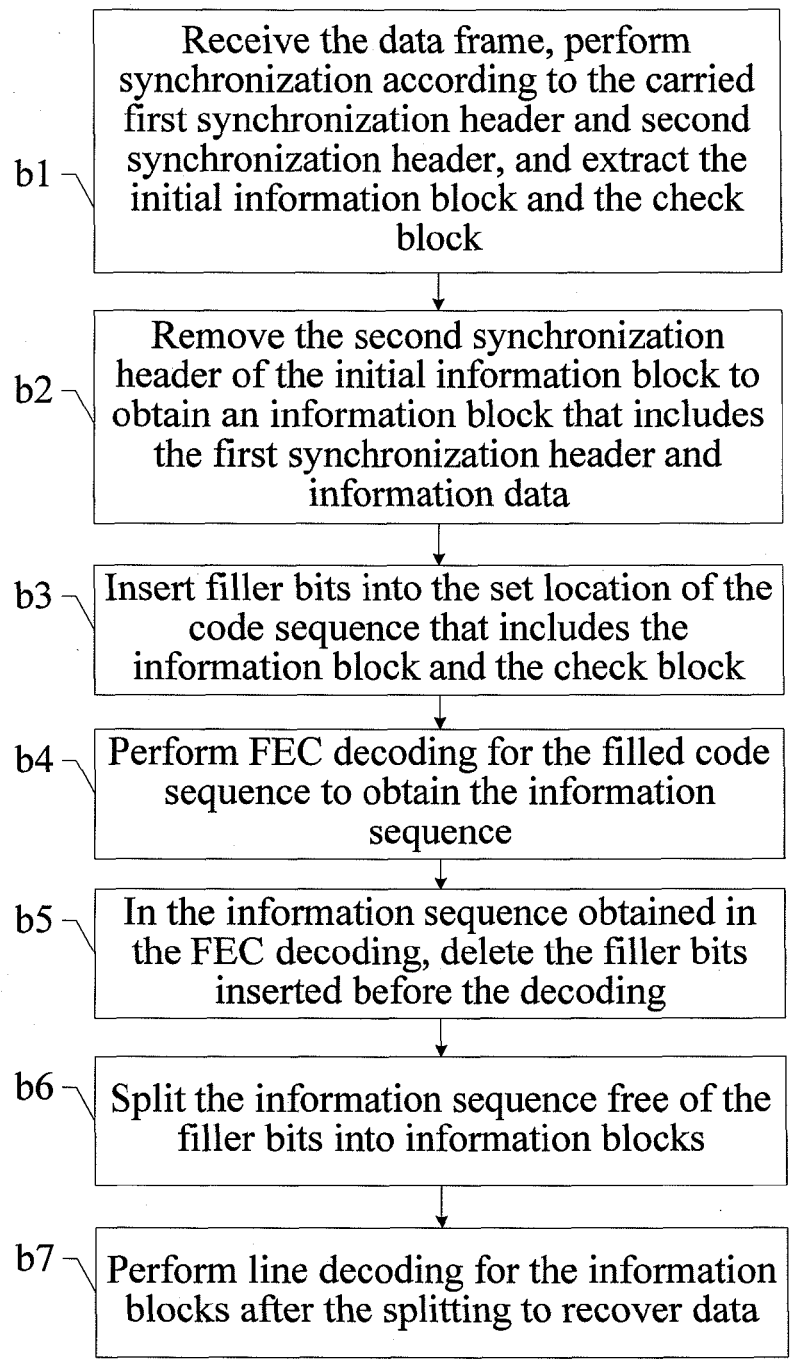
FIG. 10 is a flowchart of a data decoding method in the third embodiment of the present invention.

A data decoding method corresponding to the data coding method in the first embodiment is provided. As shown in FIG. 10, the data decoding method includes the following steps:

b1: Receive a data frame which includes an initial information block and a corresponding check block, where the length of the initial information block is L1+1, and the initial information block includes a 2-bit data synchronization header composed of a 1-bit first synchronization header and a 1-bit second synchronization header; synchronize the data frame according to the 2-bit data synchronization header; and extract the initial information block and the check block.

b2: Remove the 1-bit second synchronization header of the initial information block to obtain an information block that includes the 1-bit first synchronization header and the information data.

b3: Obtain the code sequence that includes N information blocks and the corresponding M check blocks, where the length of the code sequence is N*L1+M*L2<n, and L2 is the length of the check block and n is the length of the sequence required for FEC decoding; and insert n−(N*L1+M*L2) filler bits into the set location of the code sequence. The insertion mode is the same as the insertion mode in the FEC coding.

b4: Perform FEC (n, k) decoding for the filled code sequence to obtain the information sequence that includes N information blocks.

b5: In the information sequence obtained in the FEC decoding, delete the filler bits inserted before the decoding.

b6: Split the information sequence free of the filler bits into N information blocks.

b7: Perform line decoding for the information blocks after the splitting to recover data.

Embodiment 4

Figure 11:
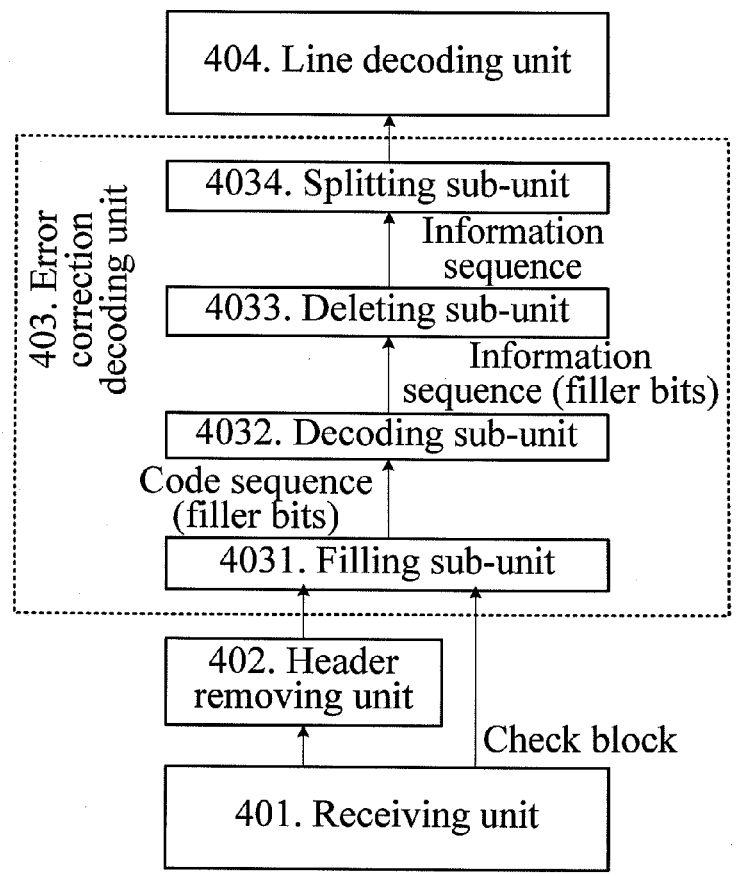
FIG. 11 shows a logical structure of a data decoding apparatus in the fourth embodiment of the present invention.

A data decoding apparatus is provided to perform the data decoding method in the second embodiment. As shown in FIG. 11, the logical structure of the data decoding apparatus includes: a receiving unit 401, a header removing unit 402, an error correction decoding unit 403, and a line decoding unit 404.

The receiving unit 401 is configured to: receive a data frame which includes an initial information block and a corresponding check block, where the length of the initial information block is L1+1, and the initial information block includes a 2-bit data synchronization header composed of a 1-bit first synchronization header and a 1-bit second synchronization header; and synchronize the data frame according to the 2-bit data synchronization header, and output the initial information block and the check block;

The header removing unit 402 is configured to: remove the 1-bit second synchronization header of the initial information block, and output an information block that includes the 1-bit first synchronization header and information data.

The error correction decoding unit 403 includes a filling sub-unit 4031, a decoding sub-unit 4032, a deleting sub-unit 4033, and a splitting sub-unit 4034, as detailed below.

The filling sub-unit 4031 is configured to: obtain the code sequence that includes N information blocks and the corresponding M check blocks, where the length of the code sequence is N*L1+M*L2<n, and L2 is the length of the check block and n is the length of the sequence required for FEC decoding; and insert n−(N*L1+M*L2) filler bits into the set location of the code sequence.

The decoding sub-unit 4032 is configured to perform FEC (n, k) decoding for the filled code sequence and output the information sequence that includes N information blocks.

The deleting sub-unit 4033 is configured to delete the filler bit in the information sequence output by the decoding sub-unit 4032.

The splitting sub-unit 4034 is configured to split the information sequence free of the filler bits into N information blocks and output them.

The line decoding unit 404 is configured to perform line decoding for the information block output by the error correction decoding unit 403, and output recovered data.

Embodiment 5

A data coding method is provided in this embodiment. This embodiment differs from the first embodiment in that: Before the FEC coding, the information block sequence is arranged, and the first synchronization headers of the information blocks are gathered together. The method in this embodiment includes the following steps:

Steps c1-c3 are the same as steps a1-a3, and thus are not repeatedly described.

c4: Arrange the 1-bit first synchronization headers of the information blocks in the information sequence to the set location. The arrangement operation may occur before, during, or after the filling operation in step c3. Generally, the centralized N first synchronization headers may be arranged at the head or end of the information sequence (free of the filler bits). For ease of processing, the N centralized first synchronization headers may be arranged according to the order of the information blocks in the information sequence.

c5: Perform FEC coding for the filled and arranged information sequence to generate M check blocks, and output the filled and arranged information sequence for coding.

c6: Rearrange the first synchronization headers, which are arranged altogether in the information sequence of the code sequence, to the corresponding information blocks. The rearrangement operation may occur before, during or after the deletion operation in step c7.

Steps c7-c9 are the same as steps a5-a7, and thus are not repeatedly described.

In this embodiment, before the FEC coding, the contents of the information block sequence are arranged, and the first synchronization headers of all information blocks are gathered together. Therefore, the error correction protection for the first synchronization headers is enhanced, and practice proves that the system implementation is easier. Like the first embodiment, in this embodiment, it is assumed that the information block in the FEC coding result is the object to which the synchronization header is added. Therefore, it is not necessary to buffer the information sequence obtained in step c2, and no buffer is required. Alternatively, the information sequence obtained in step c2 may be applied, and therefore, the rearrangement operation and the deletion operation in step c6 and step c7 are not required, and the processing is simplified. In practice, the operation may be selected as required.

Embodiment 6

Figure 12:
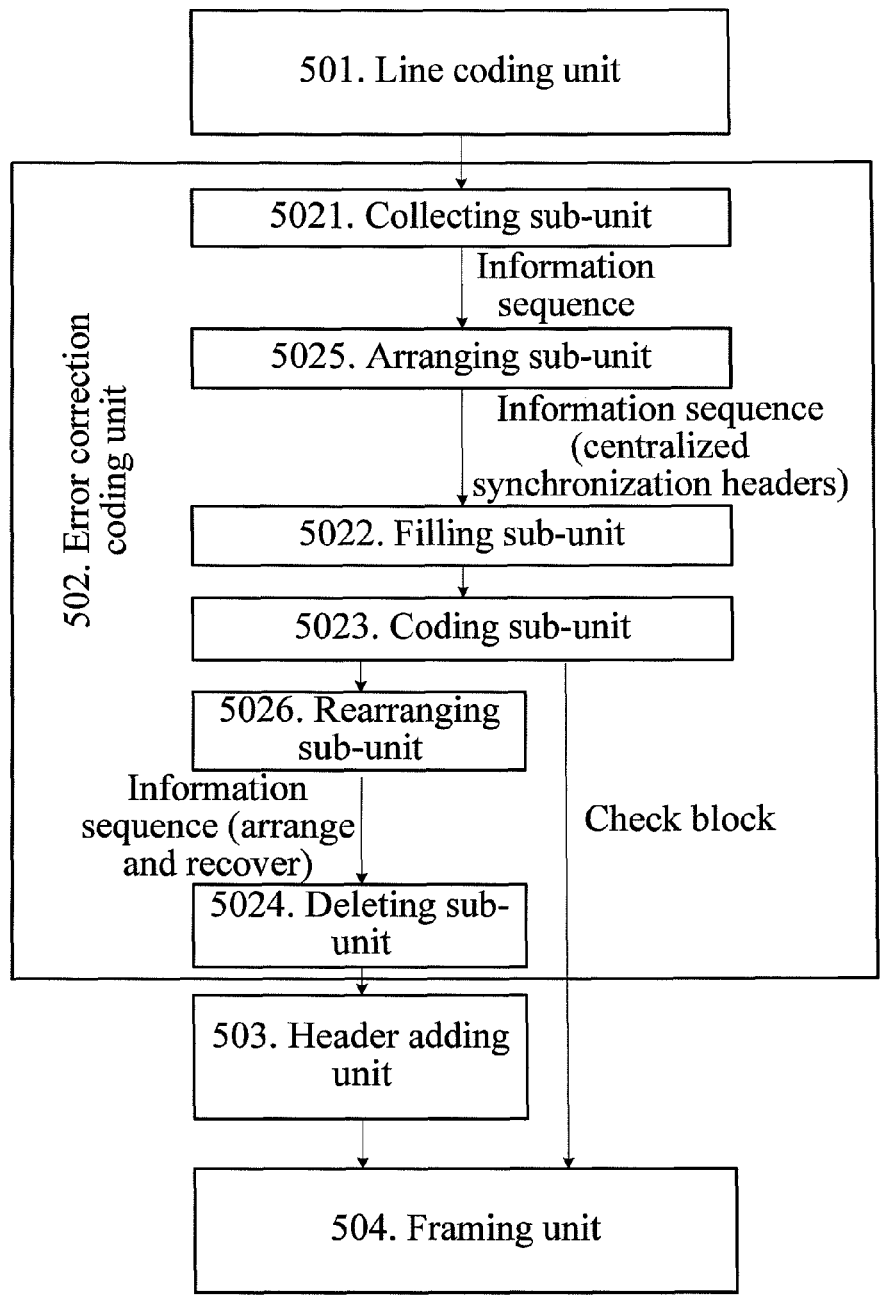
FIG. 12 shows a logical structure of a data coding apparatus in the sixth embodiment of the present invention.

A data coding apparatus is provided to perform the data coding method in the fifth embodiment. As shown in FIG. 12, the logical structure of the data coding apparatus includes: a line coding unit 501, an error correction coding unit 502, a header adding unit 503, and a framing unit 504. Except the error correction coding unit 502, the logical functions of the units are the same as the logical functions of the counterpart units in the second embodiment.

The error correction coding unit 502 includes a collecting sub-unit 5021, a filling sub-unit 5022, a coding sub-unit 5023, a deleting sub-unit 5024, an arranging sub-unit 5025, and a rearranging sub-unit 5026.

The collecting sub-unit 5021 is configured to collect N information blocks and output the generated information blocks. The length of the output information sequence is N*L1<k, where k is the length of the sequence required for FEC coding.

The arranging sub-unit 5025 is configured to: arrange the first synchronization headers of all information blocks in the information sequence output by the collecting sub-unit 5021 in the set location, and output the arranged information sequence to the filling sub-unit 5022.

The filling sub-unit 5022 is adapted: to insert k−N*L1 filler bits into the set location of the information sequence output by the arranging sub-unit 5025, and output the filled information sequence to the coding sub-unit 5023.

The coding sub-unit 5023 is configured to perform FEC (n, k) coding for the input information sequence, and output the generated M check blocks and the filled information sequence for coding.

The rearranging sub-unit 5026 is configured to: rearrange the first synchronization headers, which are arranged altogether in the information sequence output by the coding sub-unit 5023, to the corresponding information blocks, and output the rearranged information sequence.

The deleting sub-unit 5024 is configured to delete the filler bit in the information sequence output by the rearranging sub-unit 5026.

In the apparatus in this embodiment, the logical location of the arranging sub-unit is swappable with the logical location of the filling sub-unit, and the logical location of the deleting sub-unit is swappable with the logical location of the rearranging sub-unit.

Embodiment 7

Corresponding to the data coding method in the fifth embodiment, a data decoding method includes the following steps:

Steps d1-d3 are the same as steps b1-b3, and thus are not repeatedly described.

d4: Arrange the 1-bit first synchronization headers of the information blocks in the code sequence to the set location. The arrangement mode is the same as that in the FEC coding. The arrangement operation may occur before, during, or after the filling operation in step d3.

d5: Perform FEC (n, k) decoding for the filled and arranged code sequence to obtain the information sequence that includes N information blocks.

d6: Rearrange the first synchronization headers, which are arranged altogether in the information sequence obtained in the FEC decoding, to the corresponding information blocks. The rearrangement operation may occur before, during or after the deletion operation in step d7.

Steps d7-d9 are the same as steps b5-b7, and thus are not repeatedly described.

Embodiment 8

Figure 13:
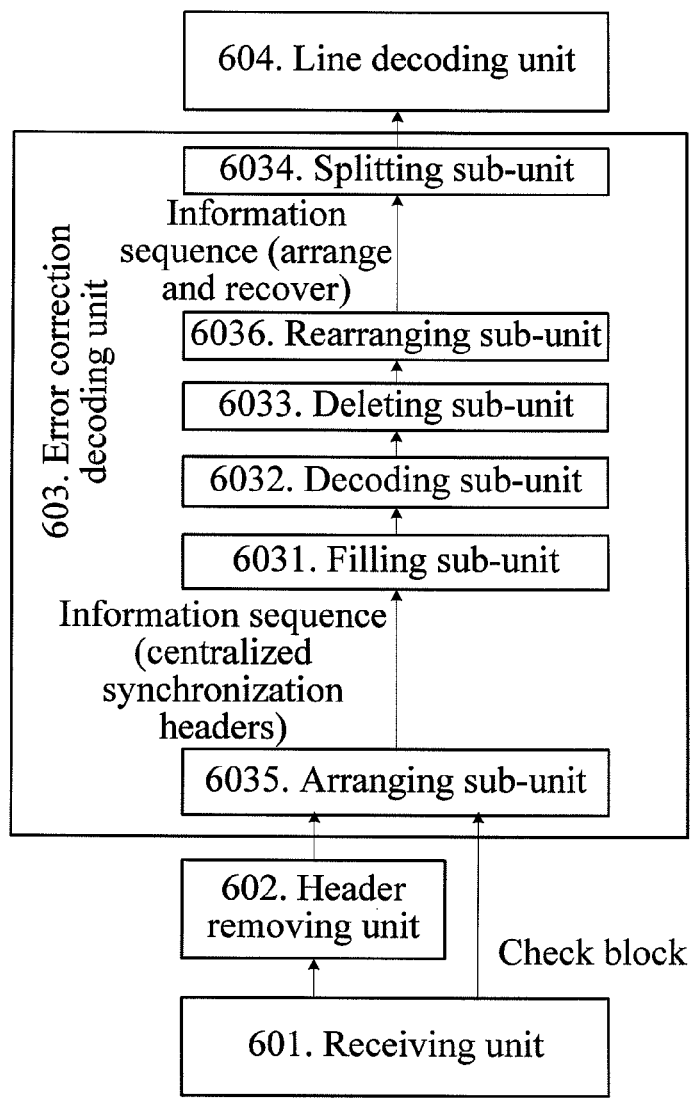
FIG. 13 shows a logical structure of a data decoding apparatus in the eighth embodiment of the present invention.

A data decoding apparatus is provided to perform the data decoding method in the seventh embodiment. As shown in FIG. 13, the logical structure of the data decoding apparatus includes: a receiving unit 601, a header removing unit 603, an error correction decoding unit 603, and a line decoding unit 604. Except the error correction decoding unit 603, the logical functions of the units are the same as the logical functions of the counterpart units in the fourth embodiment.

The error correction decoding unit 603 includes a filling sub-unit 6031, a decoding sub-unit 6032, a deleting sub-unit 6033, a splitting sub-unit 6034, an arranging sub-unit 6035, and a rearranging sub-unit 6036.

The arranging sub-unit 6035 is configured to: obtain the code sequence that includes N information blocks and corresponding M check blocks, arrange the first synchronization headers of all information blocks in the code sequence in the set location, and output the arranged code sequence to the filling sub-unit 6031.

The filling sub-unit 6031 is configured to: insert n−(N*L1+ M*L2) filler bits into the set location of the input code sequence, where N*L1+M*L2<n, and L2 is the length of the check block and n is the length of the sequence required for FEC decoding; and output the filled code sequence to the decoding sub-unit 6032.

The decoding sub-unit 6032 is configured to perform FEC (n, k) decoding for the input code sequence and output the information sequence that includes N information blocks.

The deleting sub-unit 6033 is configured to delete the filler bit in the information sequence output by the decoding sub-unit 6032.

The rearranging sub-unit 6036 is configured to: rearrange the first synchronization headers, which are arranged altogether in the information sequence whose filler bits are deleted by the deleting sub-unit 6033, to the corresponding information blocks; and output the rearranged information sequence to the splitting sub-unit 6034.

The splitting sub-unit 6034 is configured to split the information sequence input by the rearranging sub-unit 6036 into N information blocks and output them.

In the apparatus in this embodiment, the logical location of the arranging sub-unit is swappable with the logical location of the filling sub-unit, and the logical location of the deleting sub-unit is swappable with the logical location of the rearranging sub-unit.

Embodiment 9

A data coding method is provided in this embodiment. This embodiment differs from the first embodiment and the fifth embodiment in that a synchronization header is added to the check block in this embodiment. The method in this embodiment includes the following steps:

e1: Perform line coding and FEC coding for the input data that needs to be transmitted, and obtain a code sequence that includes an information block and a check block. The detailed process is the same as steps a1-a5 or steps c1-c7.

e2: Add a 1-bit second synchronization header to the information block in the code sequence, and add a 2-bit check synchronization header to the check block in the code sequence.

In this way, both the information block and the check block have a 2-bit synchronization header, which is more helpful for data synchronization at the receiver end. Because the second synchronization header is negation of the first synchronization header, the two bits of the check synchronization header may be all 0s or all 1s in order to discriminate between the code block and the check block. In order to improve the synchronization performance, a synchronization header of all 0s or all 1s may be added to each check block according to the order of arranging the check blocks. For example, the adding order may be: 00, 11, 00, 11, . . . , or 00, 11, 11, 00, . . . .

e3: This step is the same as step a7 or step c9, and thus is not repeatedly described.

Embodiment 10

Figure 14:
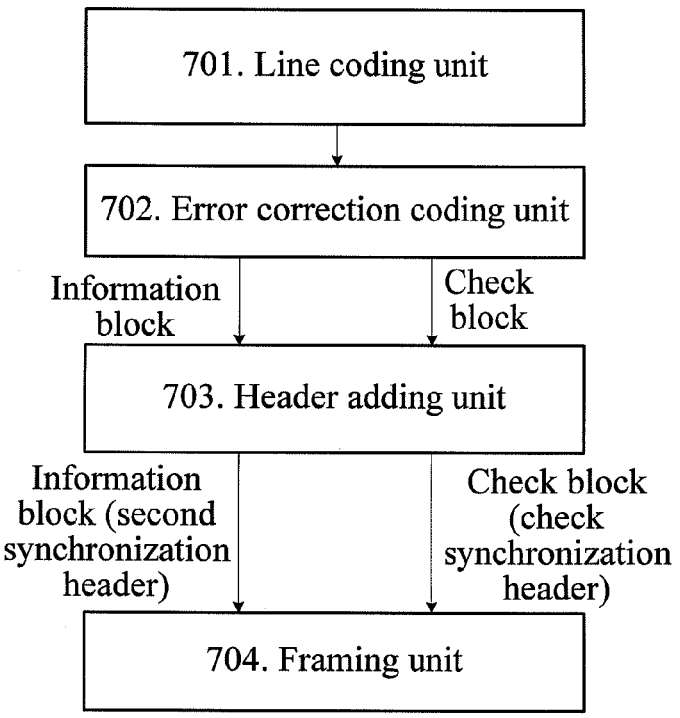
FIG. 14 shows a logical structure of a data coding apparatus in the 10th embodiment of the present invention.

A data coding apparatus is provided to perform the data coding method in the ninth embodiment. As shown in FIG. 14, the logical structure of the data coding apparatus includes: a line coding unit 701, an error correction coding unit 702, a header adding unit 703, and a framing unit 704. Except the header adding unit 703, the logical functions of the units are the same as the logical functions of the counterpart units in the second or sixth embodiment.

The header adding unit 703 is configured to add a 1-bit second synchronization header into the information block in the information sequence output by the error correction coding unit 702, and add a 2-bit check synchronization header to the check block output by the error correction coding unit 702.

Embodiment 11

Corresponding to the data coding method in the ninth embodiment, a data decoding method provided in this embodiment includes the following steps:

f1: Receive a data frame which includes an initial information block and a corresponding check block, where the length of the initial information block is L1+1, the initial information block includes a 2-bit data synchronization header composed of a 1-bit first synchronization header and a 1-bit second synchronization header, and the check block includes a 2-bit check synchronization header; and synchronize the data frame according to the data synchronization header and the check synchronization header, and extract the initial information block and the check block.

f2: Remove the 1-bit second synchronization header of the initial information block to obtain an information block that includes the 1-bit first synchronization header and the information data, remove the 2-bit check synchronization header of the check block, and obtain the 2-bit check block free of the synchronization header.

f3: Use the check block free of the synchronization header to perform FEC decoding for the information block, and then perform line decoding to finally recover the data. The detailed process is the same as steps b3-b7 or steps d3-d9, and thus is not repeatedly described.

Embodiment 12

Figure 15:
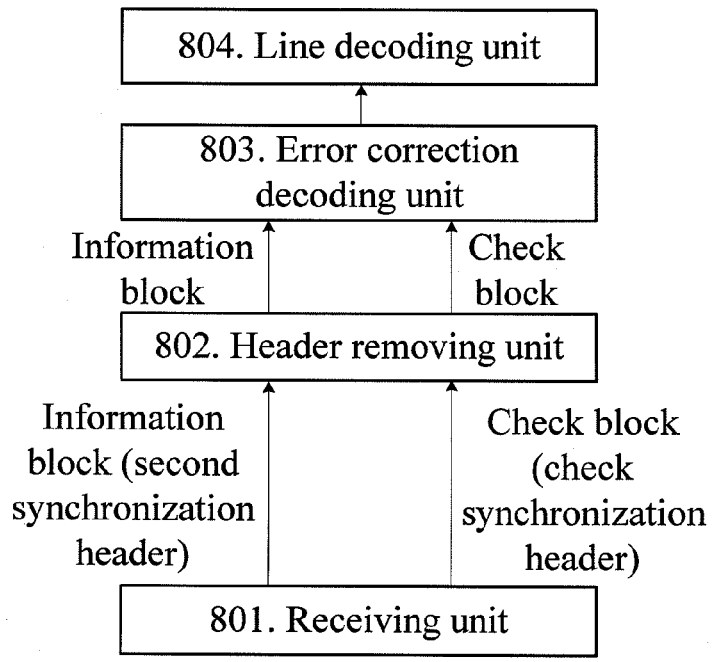
FIG. 15 shows a logical structure of a data decoding apparatus in the 12th embodiment of the present invention.

A data decoding apparatus is provided to perform the data decoding method in the $11^{th}$ embodiment. As shown in FIG. 15, the logical structure of the data decoding apparatus includes: a receiving unit 801, a header removing unit 802, an error correction decoding unit 803, and a line decoding unit 804. Except the receiving unit 801 and the header removing unit 802, the logical functions of the units are the same as the logical functions of the counterpart units in the fourth or eighth embodiment.

The receiving unit 801 is configured to: receive a data frame which includes an initial information block and a corresponding check block, where the length of the initial information block is L1+1, the initial information block includes a 2-bit data synchronization header composed of a 1-bit first synchronization header and a 1-bit second synchronization header, and the check block includes a 2-bit check synchronization header; and synchronize the data frame according to the data synchronization header and the check synchronization header, and output the initial information block and the check block.

The header removing unit 802 is configured to: remove the 1-bit second synchronization header of the initial information block, output an information block that includes the 1-bit first synchronization header and the information data, remove the 2-bit check synchronization header of the check block, and output the check block which carries no synchronization header and has a length of L2.

Embodiment 13

A data coding method is provided in this embodiment. This embodiment differs from the first, fifth, and ninth embodiments in that the information data is scrambled in this embodiment. The method in this embodiment includes the following steps:

g1: Perform line coding for the input data whose length is L1−1 to generate an information block. The length of the information block is L1, and the information block includes information data and a 1-bit first synchronization header.

g2: Scramble the information data in the information block.

g3: Perform FEC coding for the scrambled information data, and send the information data. The detailed process is the same as steps a2-a7 or steps c2-c9, and the operation of adding the synchronization header to the code sequence is similar to steps e2-e3, and thus is not repeatedly described.

It is to be noted that the scrambling after the line coding is performed only for the information data in the information block, but not for the first synchronization header.

Embodiment 14

A data coding apparatus is provided to perform the data coding method in the 13$^{th}$ embodiment. The logical structure of the data coding apparatus includes: a line coding unit, a scrambling unit, an error correction coding unit, a header adding unit, and a framing unit. Except the scrambling unit, the logical functions of the units are the same as the logical functions of the counterpart units in the 2$^{nd}$, 6$^{th}$, or 10$^{th}$ embodiment.

The scrambling unit is configured to scramble the information data in the information block output by the line coding unit, and output the scrambled information data to the error correction coding unit.

Embodiment 15

Corresponding to the data coding method in the 13$^{th}$ embodiment, a data decoding method in this embodiment includes the following steps:

h1: Receive a data frame and perform FEC decoding for it, and output an information block that includes the first synchronization header and the information data. The detailed process is the same as steps b1-b6 or steps d1-d8, and the operations of synchronizing the data frame and removing the synchronization header are similar to steps f1-f2, and are not repeated here any further.

h2: Descramble the information data in the information block. The descrambling mode is contrary to the scrambling mode at the sender end.

h3: Perform line decoding for the descrambled information blocks to recover data.

Embodiment 16

A data decoding apparatus is provided in this embodiment to perform the data decoding method in the 15$^{th}$ embodiment. The logical structure of the data decoding apparatus includes: a receiving unit, a header removing unit, an error correction decoding unit, a descrambling unit, and a line decoding unit. Except the descrambling unit, the logical functions of the units are the same as the logical functions of the counterpart units in the 4$^{th}$, 8$^{th}$, or 12$^{th}$ embodiment.

The descrambling unit is configured to descramble the information data in the information block output by the error correction decoding unit, and output the descrambled information data to the line decoding unit.

Figure 16:
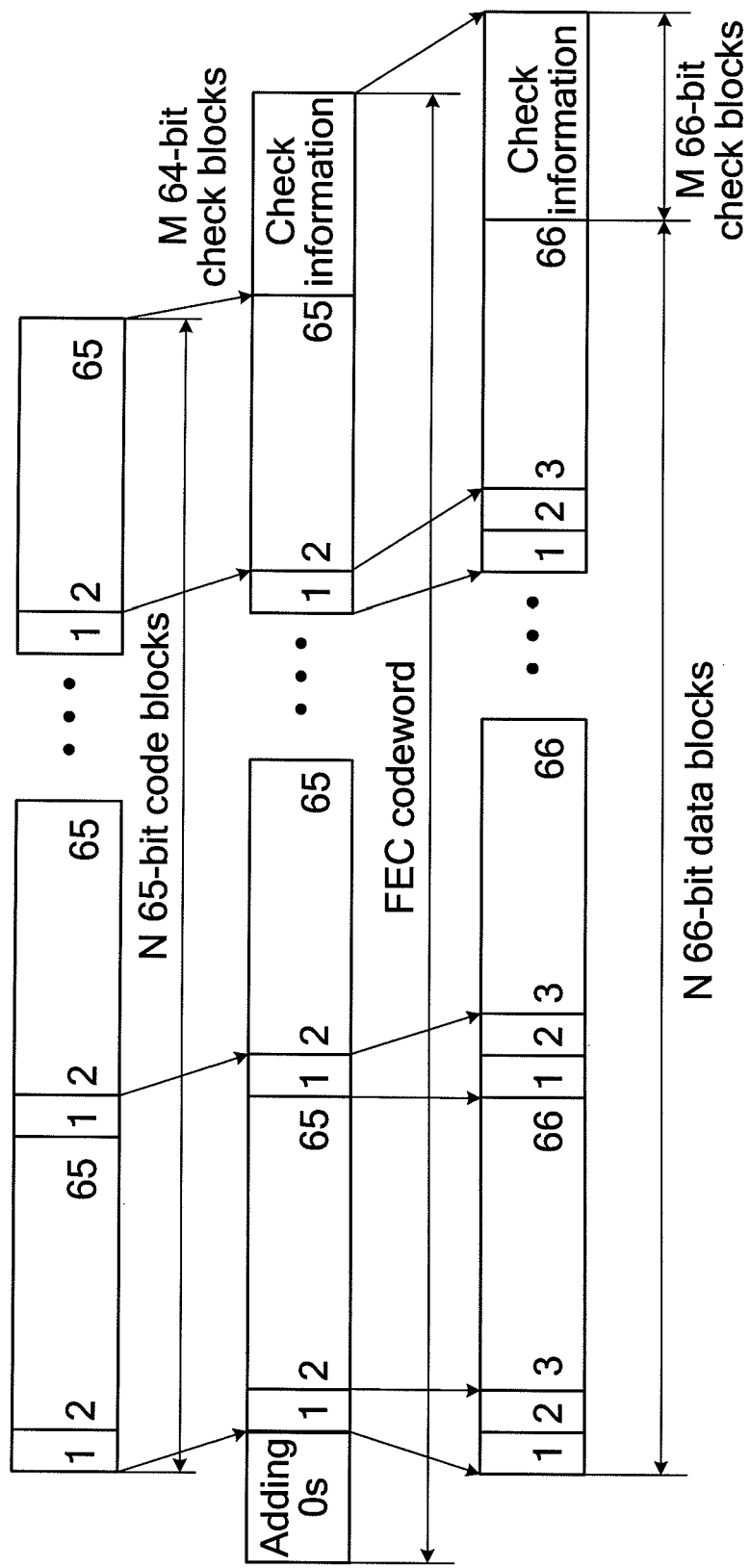
FIG. 16 shows data change in an application instance of the present invention.
Figure 17:
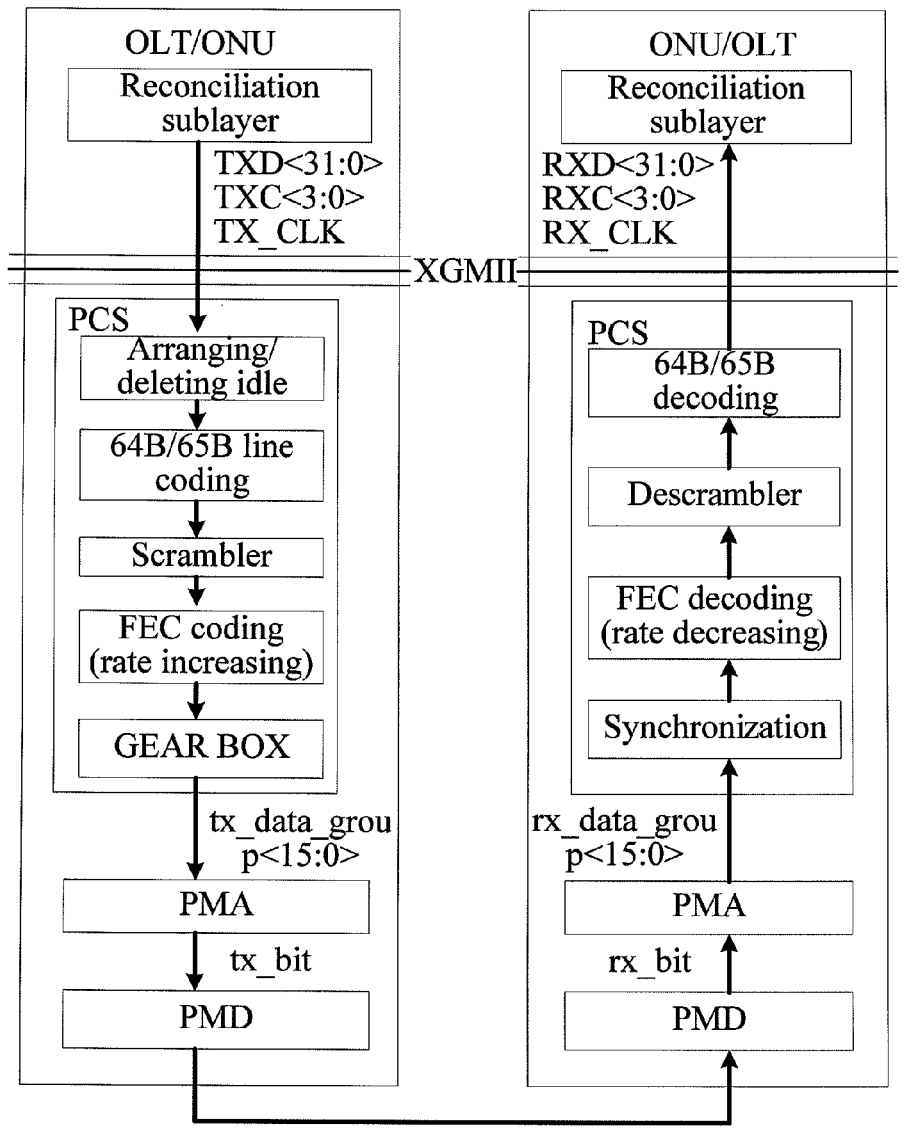
FIG. 17 is a flowchart of uplink and downlink data in different sublayers in an application instance of the present invention.

In order to make the foregoing embodiments clearer, the following gives two application instances of coding, decoding, receiving, and sending PCS data in a 10 G EPON system. In an EPON system, downlink means that an OLT sends data and an ONU receives the data, and uplink means that the ONU sends data and the OLT receives the data. FIG. 16 shows data change in an application instance of the present invention. The first line is N scrambled 64 B/65 B code blocks. The second line is a frame structure obtained after FEC coding. The length of the 64 B/65 B code block serving as a data part is 65*N, and 0s are added at the head to accomplish the data length "k" of the FEC. The length of the check part is 64*M. The third line is an FEC code frame after synchronization bits are added. A 2-bit synchronization header is added before each 64-bit check block so that the length of the check block reaches 66 bits. 1-bit control information is added before each 65-bit data block (or the 1-bit control information is added between the data/control header and the 64-bit data of each 65-bit code block). FIG. 17 is a flowchart of uplink and downlink data in different sublayers in an application instance of the present invention.

Application Instance 1 of the Foregoing Embodiments

In this application instance, 64 B/65 B line coding is applied. After the FEC coding, a 1-bit synchronization header is added to the information block, and a 2-bit synchronization header is added to the check block.

Figure 18:
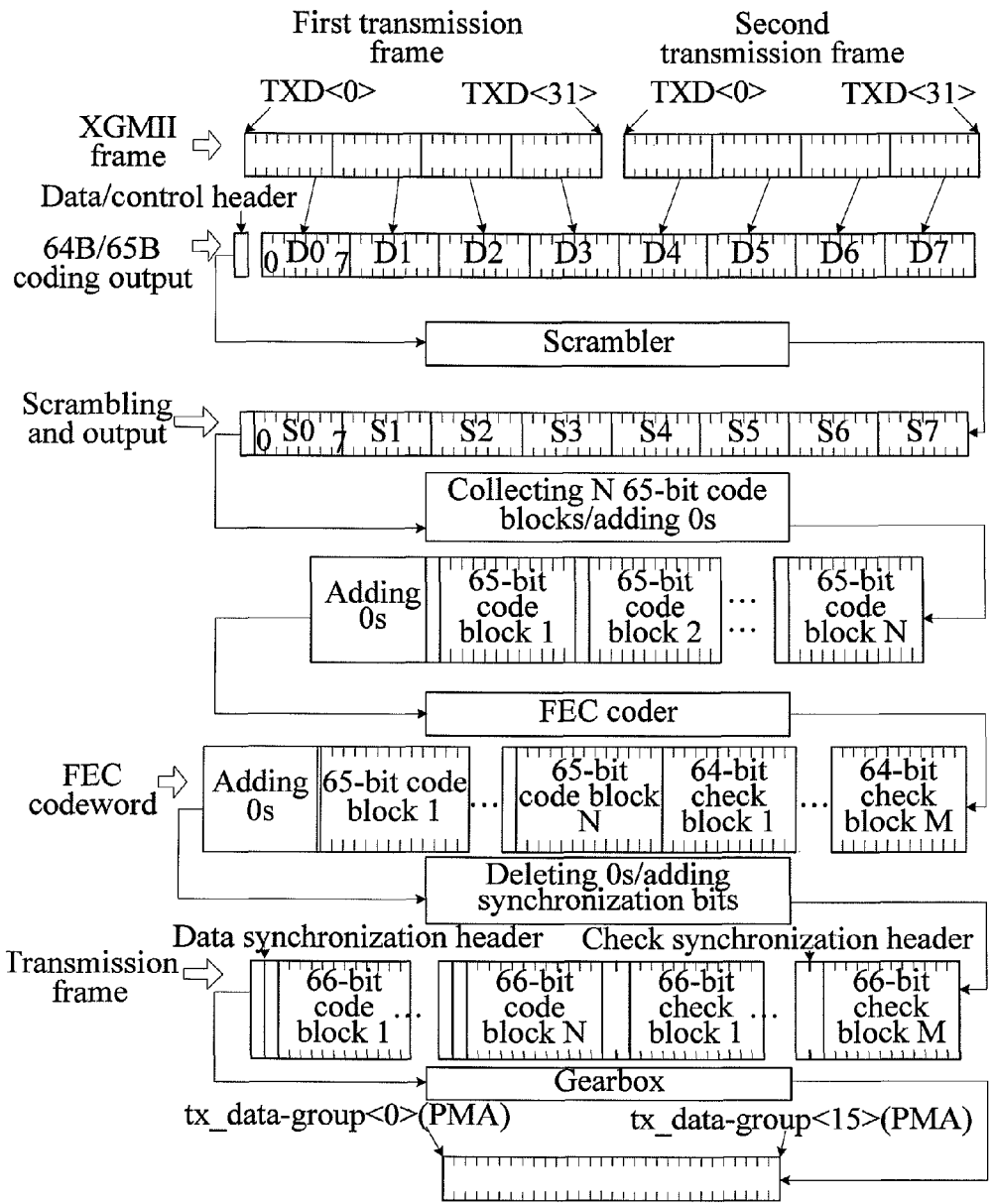
FIG. 18 is a flowchart at the sender end in the first application instance of the present invention.

As shown in FIG. 18, the sender process includes:

(1) 64 B/65 B Coding Process

In an EPON system, the data information, control information, and clock information transmitted from the reconciliation sublayer of the MAC layer pass through the XGMII and then enter the PCS sublayer. Each XGMII transmission frame includes 32-bit data TXD<31:0> and 4-bit control information TXC<3:0>. The 64 B/65 B coder maps two continuous XGMII transmission frames to a 65-bit 64 B/65 B code block according to its control information. The 64 B/65 B code block includes 64-bit data information and 1-bit data/control header. The 1-bit data/control header identifies the type of the 64-bit data information in the code block. If the data/control header is 0, the transmitted 64-bit information is data information; if the data/control header is 1, the transmitted 64-bit information includes control information.

(2) Scrambling Process

The 64-bit data information D0-D7 (each D includes 8 bits) in each 64 B/65 B code block enters an auto sync scrambler to undergo scrambling, and S0-S7 (each S includes 8 bits) are output. The expression of the master scrambler is: $G(x)=1+x^{39}+x^{58}$. The expression of the slave scrambler is: $G(x)=1+x^{19}+x^{58}$. The scrambling ensures enough changeover of the level of the transmitted data, and facilitates clock recovery at the receiver end.

(3) FEC Coding Process

The scrambled data and the data/control header together as input data bits of the FEC coder are sent into the buffer, and, when the data bits in the buffer constitute an FEC coding data frame, the FEC coding data frame is sent into the FEC coder for coding.

Generally, the buffer needs to collect N 65-bit code blocks, where N depends on the selected FEC codeword (n, k) and some special requirements of the system (for example, the system requires the total number of blocks of the coded 65-bit data blocks and 64-bit check blocks to be a specific number such as a multiple of 5). For the selected FEC codeword, the maximum number (T) of 65-bit code blocks included in the data part of the FEC codeword is:

$$T = \left\lfloor \frac{k}{65} \right\rfloor,$$

where $\lfloor \ \rfloor$ refers to rounding down.

If the selected N value is T, when k is not a multiple of 65, namely, when k−N*650, the number of 0s that need to be added before the N 65-bit code blocks is k−T*65; if the selected N value is less than T, the number of 0s that need to be added before the N 65-bit code blocks is k−N*65. Afterward, the N 65-bit code blocks with the added 0s are sent to the FEC coder for coding.

In order to facilitate synchronization, the check bits of the FEC codeword that has undergone the FEC coding is generally a multiple of 64. That is, n−k is exactly divisible by 64. The number of check blocks is M=(n−k)/64. The framing process of the FEC coding is described below, taking RS (255, 239), RS (255, 231), and RS (255, 223) as examples. The RS (255, 239), the RS (255, 231), and the RS (255, 223) may be collectively called the first coder RS, the second coder RS, and the third coder RS respectively.

If the selected FEC codeword is RS (255, 239) and its code length is n=255*8=2040 and the data length is k=239*8=1912, the length of the check information of the codeword is n−k=128. T==29. If the value of N is T=29, the number of 65-bit code blocks required for coding is 29. Because 1912−29*65=27, it is necessary to add 27 bits of 0s before the code blocks, which are then sent to the RS (255, 239) for coding. The number of check blocks generated after the coding is M=128/64=2. If the value of N is 28, namely, the number of 65-bit code blocks required for coding is 28, the number of 0s that need to be added before the code blocks is 27+65=92. After the RS (255, 239) coding, the number of 65-bit data blocks is 28, the number of 64-bit check blocks is 2, and the total number of blocks of 30.

If the selected FEC codeword is RS (255, 231), its code length n is 2040, and the data length k is 1848, T=28. If the value of N is also 28, the number of 0s that need to be added before the code blocks is 28, and the number of check blocks is M=3. If the value of N is 27, the number of 0s that need to be added is 93. After the coding, the number of 65-bit data blocks is 27, the number of 64-bit check blocks is 3, and the total number of blocks of 30.

If the selected FEC codeword is RS (255, 223), its code length n is 2040, and the data length k is 1784. T=27. If the value of N is also 27, the number of 0s that need to be added before the code blocks is 29, and the number of check blocks is M=4. If the value of N is 26, the number of 0s that need to be added is 94. After the coding, the number of 65-bit data blocks is 26, the number of 64-bit check blocks is 4, and the total number of blocks of 30.

(4) Deleting 0s/adding synchronization bits

The 0s added before the FEC coding to accomplish the FEC data length k carry no information, and do not need to be transmitted in the channel. Therefore, the added 0s need to be deleted after the FEC coding.

In order to better synchronize the code blocks and the FEC codeword at the receiver end, synchronization bits are added to the codeword after the FEC coding. For a 65-bit code block, 1 bit is added before it, and this bit is negation of the data/control header of the 65-bit code block. The added bit combines with the data/control header into a data synchronization header. For a 64-bit check block, a 2-bit check synchronization header is added before it, and the check synchronization header may be "00" or "11".

If the selected FEC codeword is RS (255, 239), the number of check blocks is M=2, and the synchronization header added to the check blocks may be "00" and "11". That is, the synchronization header of the first check block is "00", and the synchronization header of the second check block is "11". Alternatively, the synchronization header added to the check blocks may be "11" and "00".

If the selected FEC codeword is RS (255, 223), the number of check blocks is M=4, and the synchronization header added to the check blocks comes in 2⁴=16 types. Different synchronization headers exert different effects on the performance of system synchronization. If the number of check blocks is 4, the synchronization headers added to the four check blocks are "00", "11", "11", and "00" respectively, or "11", "00", "00", and "11" respectively, which accomplish a good synchronization effect.

(5) Framing and Sending

After the 0s are removed from a frame and the synchronization bits are added to the frame, the frame becomes a transmission frame. The data width of the PCS sublayer is 66 bits, and the data width of the PMA layer is 16 bits. In order to accomplish rate matching, the transmission frame needs to be sent to a GearBox unit, in which the transmission frame changes to the data mode receivable by the PMA.

Figure 19:
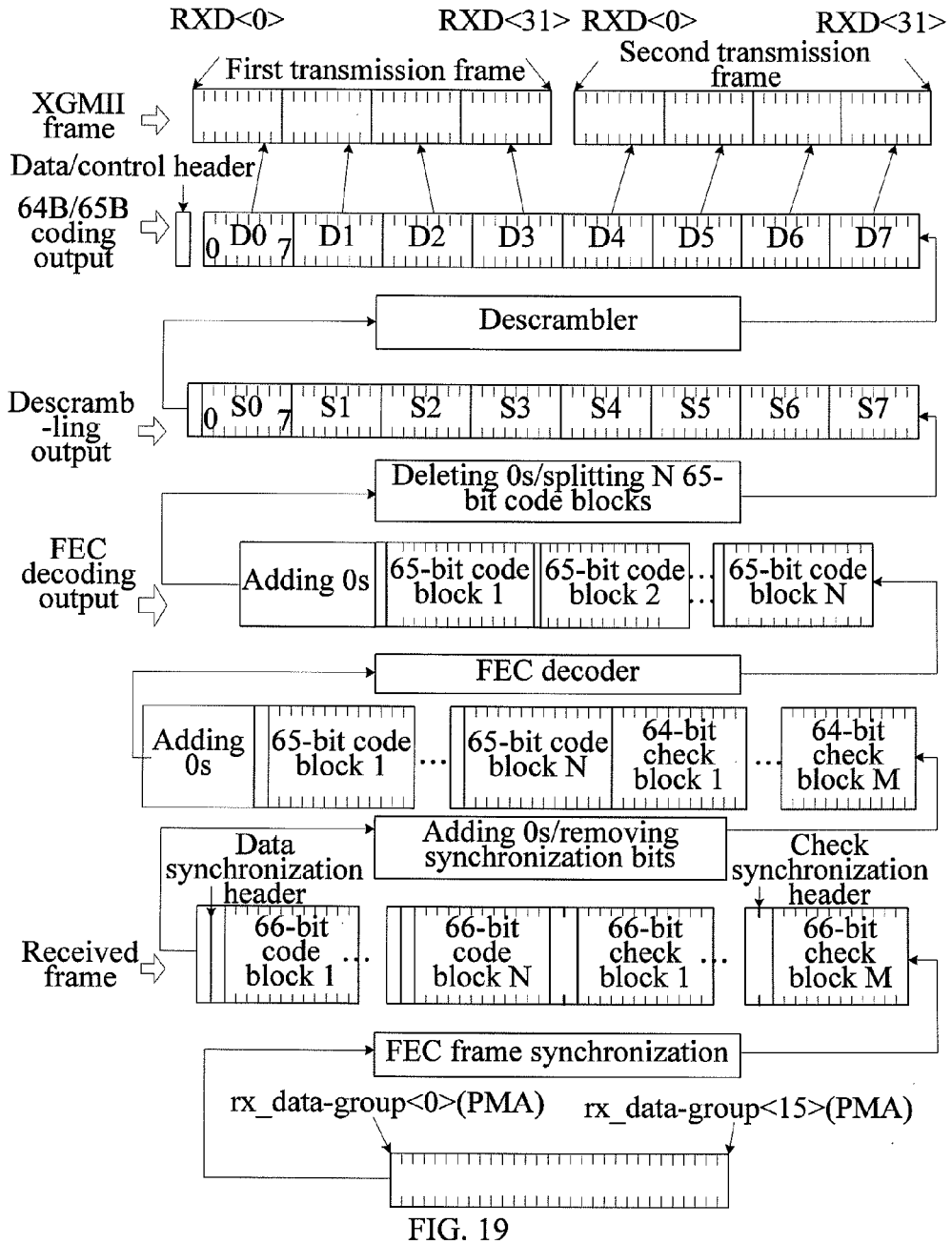
FIG. 19 is a flowchart at the receiver end in the first application instance of the present invention.

As shown in FIG. 19, the receiver process includes the following steps:

(1) FEC Frame Synchronization

At the receiver end, the data received from the fiber is transmitted to the PMD and the PMA, and then enters the PCS. On the PCS, frame synchronization is performed for the received data.

One received frame includes N 66-bit data blocks and M 66-bit check blocks, and each data block includes a 2-bit synchronization header, so does the check block. Such information may be used to perform frame synchronization for the data transmitted from the PMA. After the frame synchronization, the beginning and the end of the received frame are known, and the complete FEC frame is obtained for facilitating the decoding.

(2) Adding 0s/Removing Synchronization Bits

After completion of frame synchronization, the 2-bit synchronization header is removed from the 66-bit check block in the received frame, and the check block becomes a 64-bit check block. The first synchronization header in the 66-bit data block is removed, and the data block becomes a 65-bit data block.

For the purpose of FEC decoding, 0s need to be added before the data block, and the number of added 0s is the same as the counterpart number at the transmitter. For example, for RS (255, 239), the number of 0s to be added is 27; for RS (255, 223), the number of 0s to be added is 29.

(3) FEC Decoding

After the 0s are added to the received frame and the synchronization bits are removed from the received frame, the received frame is sent to the FEC decoder for decoding. In the sequence obtained through the decoding, the 0s are deleted, and the N 65-bit code blocks are obtained.

(4) Descrambling

The N 65-bit code blocks are separated, and each 65-bit code block is processed. First, the 64-bit data in the 65-bit code block is descrambled. The descrambling process is contrary to the scrambling process.

(5) 64 B/65 B Decoding

The descrambled 65-bit code block is mapped according to the 64 B/65 B coding rule, and two XGMII frames are recovered and sent to the upper layer for processing.

Application Instance 2 of the Foregoing Embodiments

This application instance differs from the first application instance in that: Before the FEC coding, the data/control headers obtained in the line coding are centralized.

Figure 20:
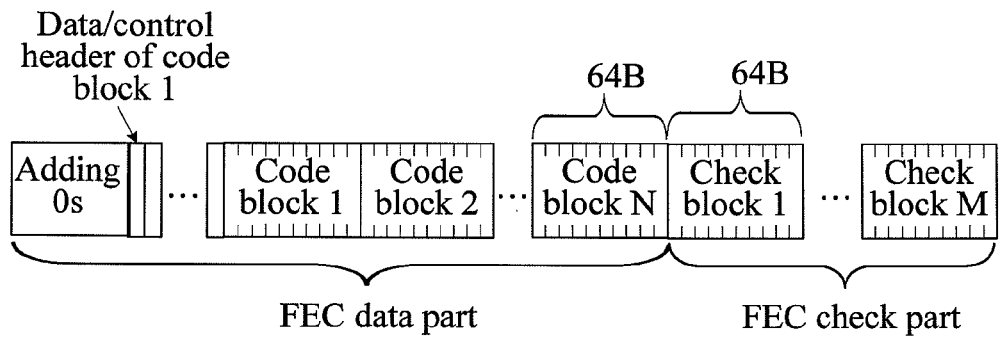
FIG. 20 shows an FEC frame structure in the second application instance of the present invention.

In the code blocks that have undergone the 64 B/65 B coding, the data/control header located in the first bit is essential. It decides the mapping relation between the 64-bit data of the PCS and the XGMII. If this bit is erroneous, the mapping may be erroneous, and the data transmitted to the upper layer may be erroneous. In this application instance, the data/control headers of the collected N 65-bit code blocks are put together in an FEC frame for being protected. That improves the anti-interference capability of the data/control header, and facilitates the industrial implementation. FIG. 20 illustrates the FEC frame structure in this application instance. Its data part includes the added 0s, data/control headers of the centralized N 65-bit code blocks, and 64-bit information loaded on the N 65-bit code blocks; and its check part includes M 64-bit check blocks.

In the FEC coding based on the RS codes, because the RS codes are symbol-based multi-ary codes, for RS (255, 239), RS (255, 231) and RS (255, 223), every 8 bits are mapped to 1 symbol before the coding. The decoding is also performed per symbol. That is, if a symbol can be decoded correctly, all 8 bits corresponding to the symbol can be decoded correctly. Therefore, all data/control headers are put together to accomplish effective protection.

Figure 21:
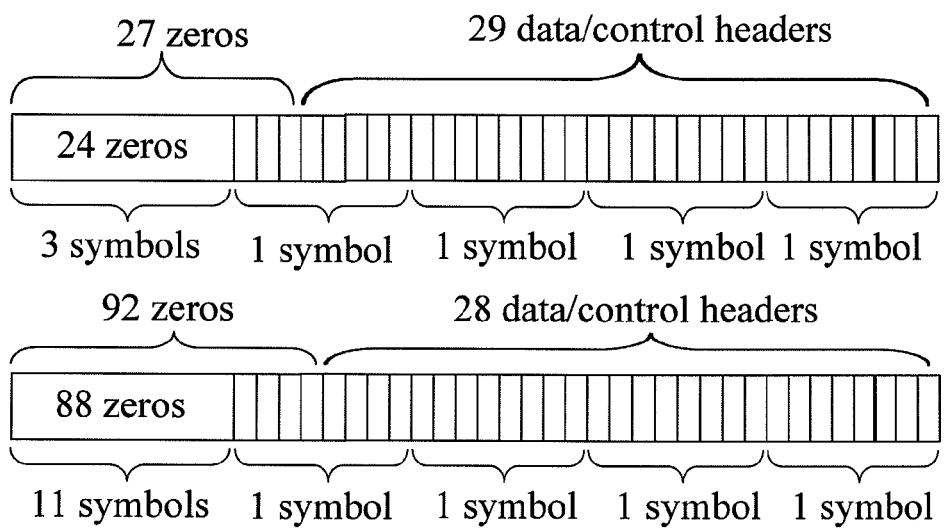
FIG. 21 shows FEC coding mapping at RS (255, 239) in the second application instance of the present invention, where RS is an acronym of Reed-Solomon.

As shown in FIG. 21, for the FEC frame corresponding to the RS (255, 239), if the value of N is 29, its 29 data/control headers are put together, and then 27 zeros are added before them. Because the RS (255, 239) maps 8 bits to 1 symbol, the mapping shown in the upper part of FIG. 21 may be performed in the FEC framing. The first 24 of the 27 zeros are mapped to 3 symbols, the last 3 zeros and the first 5 of the 29 data/control headers are mapped to 1 symbol, and then the last 24 data/control headers are mapped to 3 symbols. If the value of N is 28, the 28 data/control headers are put together, and then 92 zeros are added before them. The mapping mode of the FEC framing is shown in the lower part of FIG. 21. The first 88 of the 92 added zeros are mapped to 11 symbols, the last 4 zeros and the first 4 of the 28 data/control headers are mapped to 1 symbol, and then the last 24 data/control headers are mapped to 3 symbols.

Figure 22:
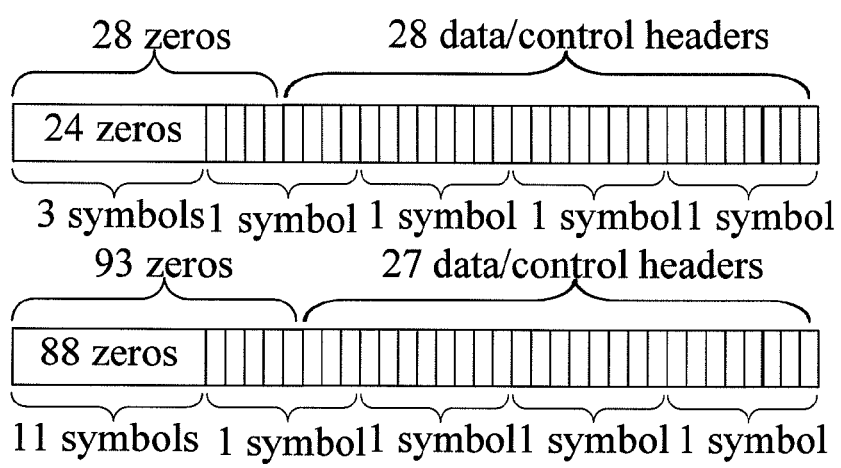
FIG. 22 shows FEC coding mapping at RS (255, 231) in the second application instance of the present invention.

As shown in FIG. 22, for the FEC frame corresponding to the RS (255, 231), if the value of N is 28, its 28 data/control headers are put together, and then 28 zeros are added before them. The mapping shown in the upper part of FIG. 22 may be performed in the FEC framing. The first 24 of the 28 added zeros are mapped to 3 symbols, the last 4 zeros and the first 4 of the 28 data/control headers are mapped to 1 symbol, and then the last 24 data/control headers are mapped to 3 symbols. If the value of N is 27, the data/control headers are put together, and then 93 zeros are added before them. The mapping mode of the FEC framing is shown in the lower part of FIG. 22. The first 88 of the 93 added zeros are mapped to 11 symbols, the last 5 zeros and the first 3 of the 27 data/control headers are mapped to 1 symbol, and then the last 24 data/control headers are mapped to 3 symbols.

Figure 23:
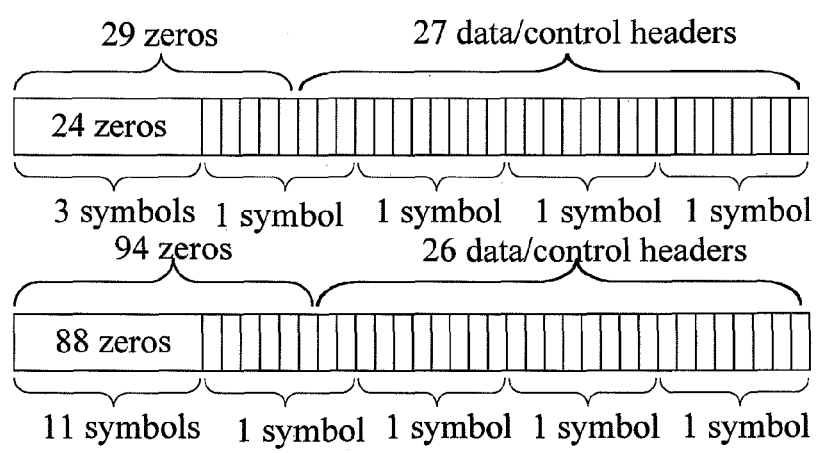
FIG. 23 shows FEC coding mapping at RS (255, 223) in the second application instance of the present invention.

As shown in FIG. 23, for the FEC frame corresponding to the RS (255, 223), if the value of N is 27, its 27 data/control headers are put together, and then 29 zeros are added before them. The mapping shown in the upper part of FIG. 23 may be performed in the FEC framing. The first 24 of the 29 added zeros are mapped to 3 symbols, the last 5 zeros and the first 3 of the 27 data/control headers are mapped to 1 symbol, and then the last 24 data/control headers are mapped to 3 symbols. If the value of N is 26, the data/control headers are put together, and then 94 zeros are added before them. The mapping mode of the FEC framing is shown in the lower part of FIG. 23. The first 88 of the 94 added zeros are mapped to 11 symbols, the last 6 zeros and the first 2 of the 26 data/control headers are mapped to 1 symbol, and then the last 24 data/control headers are mapped to 3 symbols.

Figure 24:
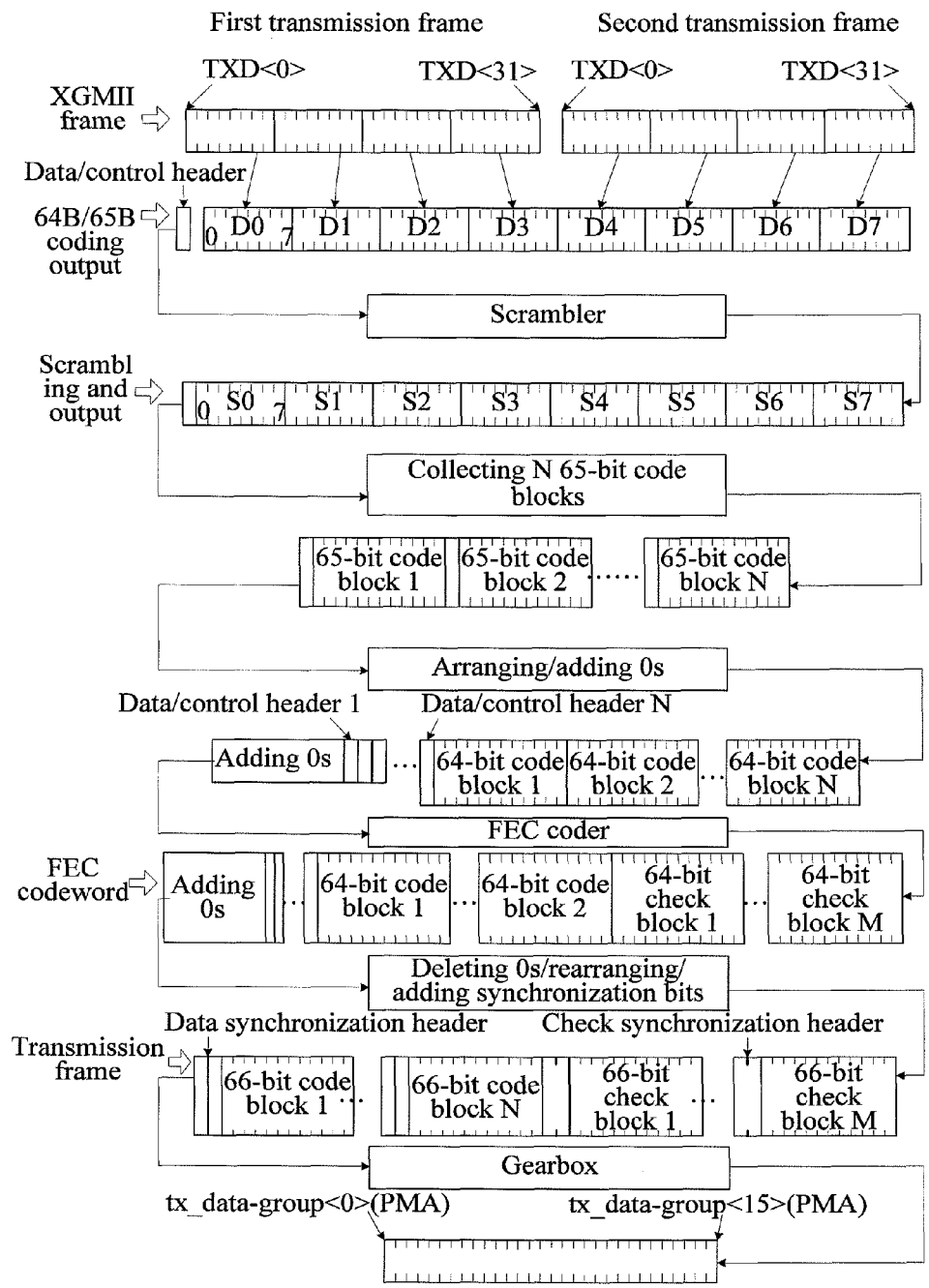
FIG. 24 is a in the second application instance of the present invention.
Figure 25:
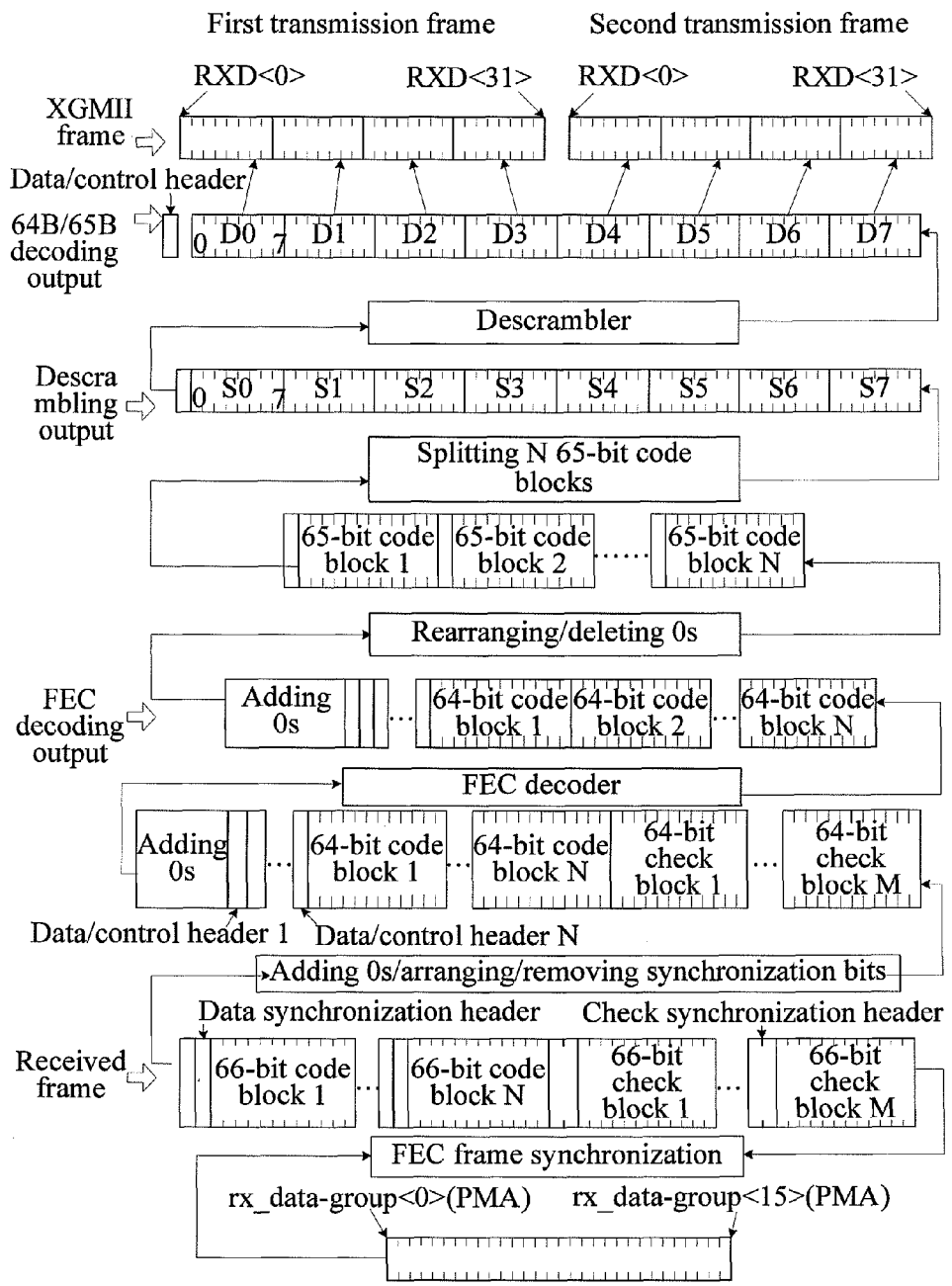
FIG. 25 is a flowchart at the receiver end in the second application instance of the present invention.

For the sender process and the receiver process in this application instance, see FIG. 24 and FIG. 25 respectively. The implementation process is almost the same as that in the first application instance except that an arrangement operation is added before the coding and a rearrangement operation is added after the decoding.

It is understandable to those skilled in the art that all or part of the steps of the methods in the foregoing embodiments and application instances may be implemented by hardware instructed by a program. The program may be stored in a computer-readable storage medium such as Read Only Memory (ROM), Random Access Memory (RAM), magnetic disk, or Compact Disk (CD).

Elaborated above are a data coding method, a data decoding method, a data coding apparatus, and a data decoding apparatus under the present invention. Application instances are used herein for expounding the principles and the implementation of the present invention. Although the invention is described through some exemplary embodiments, the invention is not limited to such embodiments. It is apparent that those skilled in the art can make modifications and variations to the invention without departing from the spirit and scope of the invention. The invention is intended to cover such modifications and variations provided that they fall in the scope of protection defined by the following claims or their equivalents.

What is claimed is:

1. A data coding method, comprising:
performing, by a data coding apparatus, line coding for input data to generate an information block which comprises information data and a first synchronization header;
performing, by the data coding apparatus, Forward Error Correction (FEC) coding for the information block to generate a check block;
adding, by the data coding apparatus, a second synchronization header to the information block; and
generating, by the data coding apparatus, a transmitting data frame which comprises the information block with the added second synchronization header and the corresponding check block.

2. The data coding method of claim 1, wherein the performing of FEC coding for the information block to generate the check block comprises:
collecting N information blocks to generate an information sequence;
arranging first synchronization headers of all information blocks in the information sequence to a set location; and
performing FEC coding for the information sequence to generate M check blocks.

3. The data coding method of claim 2, wherein:
an output result of the FEC coding is a code sequence that comprises the information sequence and the M check blocks;
after the FEC coding, the method further comprises: rearranging the first synchronization headers, which are arranged altogether in the information sequence of the code sequence, to corresponding information blocks;
the adding a second synchronization header to the information block comprises: adding the second synchronization header to each information block in the rearranged code sequence respectively.

4. The data coding method according to claim 1, wherein:
before generating the transmitting data frame, the method further comprises: adding a check synchronization header to the check block; and
the check blocks in the transmitting data frame comprises the check block with the added check synchronization header.

5. The data coding method of claim 4, wherein:
the FEC coding is Reed-Solomon (RS) coding, a codeword length of the RS coding is 255, and an information length is 239; or, the FEC coding is RS coding, the codeword length of the RS coding is 255, and the information length is 231; or the FEC coding is RS coding, the codeword length of the RS coding is 255, and the information length is 223; and, the adding of the check synchronization header to the check block is: adding a 2-bit check synchronization header to each of four check blocks generated in the RS coding according to an order of "00", "11", "11", and "00" or according to an order of "11", "00", "00", and "11", respectively.

6. The data coding method according to claim 1, wherein the second synchronization header added to the information block is obtained in the following mode:
performing set operation for the first synchronization header of the information block to obtain the second synchronization header of the information block.

7. The data coding method of claim 6, wherein:
the set operation is negation by bit.

8. The data coding method according to claim 1, wherein:
the line coding is 64-bit/65-bit (64 B/65 B) coding or 32 B/33 B coding.

9. A data decoding method, comprising:
receiving, by a data decoding apparatus, a data frame which comprises an initial information block and a corresponding check block, wherein the initial information block has a data synchronization header composed of a first synchronization header and a second synchronization header; synchronizing the received data frame according to the data synchronization header; and extracting the initial information block and the check block;
removing, by the data decoding apparatus, the second synchronization header of the initial information block to obtain an information block that comprises the first synchronization header and information data;
using, by the data decoding apparatus, the check block to perform Forward Error Correction (FEC) decoding for the first synchronization header and the information data of the information block; and
performing, by the data decoding apparatus, line decoding for the information block after the FEC decoding.

10. The data decoding method of claim 9, wherein the using of the check block to perform FEC decoding for the information block comprises:
obtaining a code sequence that comprises N information blocks and M corresponding check blocks, and arranging first synchronization headers of all information blocks in the code sequence in a set location altogether;
perform FEC decoding for the code sequence to obtain an information sequence that comprises the N information blocks;
rearranging the first synchronization headers, which are arranged in the information sequence altogether, to corresponding information blocks; and
splitting the rearranged information sequence into the N information blocks.

11. The data decoding method of claim 9, wherein:
the check block carried in the data frame comprises a check synchronization header;
the data frame is synchronized according to the data synchronization header and the check synchronization header; and
the check synchronization header is removed from the check block before the FEC decoding is performed for the information block by using the check block.

12. A data coding apparatus, comprising:
a line coding unit, configured to: perform line coding for input data, and output a generated information block which comprises information data and a first synchronization header;
an error correction coding unit, configured to: perform Forward Error Correction (FEC) coding for the information block, and output a generated check block;
a header adding unit, configured to add a second synchronization header to the information block; and
a framing unit, configured to: generate a transmitting data frame which comprises the information block with the added second synchronization header and the corresponding check block.

13. The data coding apparatus of claim 12, wherein the error correction coding unit comprises:
a collecting sub-unit, configured to collect N information blocks and output a generated information sequence;
an arranging sub-unit, configured to: arrange first synchronization headers of all information blocks in the information sequence output by the collecting sub-unit altogether in a set location, and output the arranged information sequence; and
a coding sub-unit, configured to: receive the information sequence output by the arranging sub-unit, perform FEC coding for the received information sequence, and output M generated check blocks.

14. The data coding apparatus of claim 13, wherein:
the coding sub-unit is further configured to output the received information sequence and the M check blocks together as a code sequence;
the error correction coding unit further comprises a rearranging sub-unit, which is configured to: rearrange the first synchronization headers, which are arranged altogether in the information sequence output by the coding sub-unit, to corresponding information blocks, and output the rearranged information sequence; and
the header adding unit is configured to add the second synchronization header into each information block in the information sequence output by the error correction coding unit respectively.

15. The data coding apparatus according to claim 12, wherein:
the header adding unit is further configured to add a check synchronization header to the check block; and
the check block in the transmitting data frame generated by the framing unit is the check block with the added check synchronization header.

16. A data decoding apparatus, comprising:
a receiving unit, configured to: receive a data frame which comprises an initial information block and a corresponding check block, wherein the initial information block has a data synchronization header composed of a first synchronization header and a second synchronization header; synchronize the data frame according to the data synchronization header; and output the initial information block and the check block;
a header removing unit, configured to: remove the second synchronization header of the initial information block, and output an information block that comprises the first synchronization header and information data;
an error correction decoding unit, configured to: use the check block to perform Forward Error Correction (FEC) decoding for the first synchronization header and the information data of the information block, and output the information block after the FEC decoding; and a line decoding unit, configured to: perform line decoding for the information block after the FEC decoding, and output recovered data.

17. The data decoding apparatus of claim 16, wherein the error correction decoding unit comprises:

an arranging sub-unit, configured to: obtain a code sequence that comprises N information blocks and corresponding M check blocks, arrange first synchronization headers of all information blocks in the code sequence in a set location altogether, and output the arranged code sequence;

a decoding sub-unit, configured to input the code sequence, perform FEC decoding, and output an information sequence that comprises the N information blocks;

a rearranging sub-unit, configured to: rearrange the first synchronization headers, which are arranged altogether in the information sequence output by the decoding sub-unit, to corresponding information blocks, and output the rearranged information sequence; and a splitting sub-unit, configured to split the information sequence output by the rearranging sub-unit into the N information blocks and output them.

18. The data decoding apparatus of claim 16, wherein:

the check block carried in the data frame received by the receiving unit further comprises a check synchronization header;

the data frame is synchronized by the receiving unit according to the data synchronization header and the check synchronization header; and the header removing unit is further configured to remove the check synchronization header of the check block output by the receiving unit.

* * * * *